US010846233B2

United States Patent
Kang et al.

(10) Patent No.: US 10,846,233 B2
(45) Date of Patent: Nov. 24, 2020

(54) MEMORY CONTROLLER AND APPLICATION PROCESSOR FOR CONTROLLING UTILIZATION AND PERFORMANCE OF INPUT/OUTPUT DEVICE AND METHOD OF OPERATING THE MEMORY CONTROLLER

(71) Applicant: Samsung Electronics Co., Ltd., Suwon-si (KR)

(72) Inventors: Hyun-joon Kang, Hwaseong-si (KR); Tae-hun Kim, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 16/272,248

(22) Filed: Feb. 11, 2019

(65) Prior Publication Data
US 2019/0251038 A1    Aug. 15, 2019

(30) Foreign Application Priority Data
Feb. 12, 2018    (KR) .................. 10-2018-0017059

(51) Int. Cl.
| G06F 12/10 | (2016.01) |
| G06N 20/00 | (2019.01) |
| G06F 12/0815 | (2016.01) |
| G06F 9/50 | (2006.01) |

(52) U.S. Cl.
CPC ............ *G06F 12/10* (2013.01); *G06F 9/5016* (2013.01); *G06F 12/0815* (2013.01); *G06N 20/00* (2019.01)

(58) Field of Classification Search
CPC ....................................................... G06F 12/10
See application file for complete search history.

(56) References Cited

U.S. PATENT DOCUMENTS

| 6,356,988 B1 | 3/2002 | Takizawa |
| 6,381,669 B1 | 4/2002 | Chudnovsky et al. |
| 6,757,806 B2 | 6/2004 | Shim |
| 6,819,326 B2 | 11/2004 | Jaspers |

(Continued)

FOREIGN PATENT DOCUMENTS

| JP | 2008-242999 A | 10/2008 |
| KR | 10-1242195 B1 | 3/2013 |

OTHER PUBLICATIONS

Written Opinion and Search Report dated Dec. 3, 2019 by the Intellectual Property Office of Singapore for Patent Application No. 10201901162P.

*Primary Examiner* — Edward J Dudek, Jr.
(74) *Attorney, Agent, or Firm* — Harness, Dickey and Pierce, P.L.C.

(57) ABSTRACT

Provided are a memory controller and an application processor (AP) for controlling utilization and performance of an input/output (I/O) device and a method of operating the memory controller. The memory controller includes an address translator configured to translate a first address received from a host processor into a second address indicating a memory address based on an address translation scheme selected from a plurality of address translation schemes based on memory resource utilization; and an evaluation module configured to evaluate the memory resource utilization of each of the plurality of address translation schemes based on a plurality of memory addresses generated based on each of the plurality of address translation schemes.

20 Claims, 20 Drawing Sheets

(56) References Cited

U.S. PATENT DOCUMENTS

| | | |
|---|---|---|
| 7,840,820 B2 | 11/2010 | Shimada |
| 7,870,363 B2 | 1/2011 | Tang et al. |
| 8,135,936 B2 | 3/2012 | Schaefer et al. |
| 8,711,418 B2 | 4/2014 | Cho |
| 8,799,553 B2 | 8/2014 | Hendry et al. |
| 9,009,383 B2 | 4/2015 | Hendry et al. |
| 9,201,608 B2 | 12/2015 | Hendry et al. |
| 9,405,681 B2 | 8/2016 | Ozdemir et al. |
| 9,653,184 B2 | 5/2017 | Frayer et al. |
| 2010/0318761 A1 | 12/2010 | Moyer et al. |
| 2013/0132704 A1* | 5/2013 | Ware ................. G06F 12/10 711/206 |
| 2013/0262817 A1 | 10/2013 | Bybell et al. |
| 2014/0149653 A1* | 5/2014 | Udipi ................. G11C 7/04 711/106 |
| 2014/0195742 A1 | 7/2014 | Kim et al. |
| 2015/0052329 A1 | 2/2015 | Fujinami |
| 2015/0095610 A1 | 4/2015 | Ben-Meir |
| 2015/0220137 A1* | 8/2015 | Zaarur ............... G06F 12/023 713/320 |
| 2016/0062911 A1 | 3/2016 | Kegel et al. |
| 2016/0162217 A1 | 6/2016 | Song et al. |
| 2018/0107604 A1* | 4/2018 | Dooley .............. G06F 12/1009 |
| 2018/0239714 A1* | 8/2018 | Abhishek Raja ... G06F 12/1027 |

* cited by examiner

FIG. 8

| Request queue index (QI) | Rank | Bank | Rows | EV1 (Max value: 2) Average rank usage [ranks] | EV2 (Max value: 16) Unique bank # [banks] | EV3 (Min value: 1) Average row usage per 'bank/rank' [unique rows/unique banks] |
|---|---|---|---|---|---|---|
| 1 | 0 | 1 | 0 | 1.38 | 4 | 4.00 |
| 2 | 0 | 1 | 1 | | | |
| 3 | 0 | 3 | 0 | | | |
| 4 | 0 | 3 | 1 | | | |
| 5 | 0 | 3 | 2 | | | |
| 6 | 0 | 3 | 3 | | | |
| 7 | 0 | 3 | 4 | | | |
| 8 | 0 | 7 | 0 | | | |
| 9 | 0 | 7 | 1 | | | |
| 10 | 0 | 7 | 2 | | | |
| 11 | 0 | 7 | 3 | | | |
| 12 | 0 | 7 | 4 | | | |
| 13 | 0 | 7 | 5 | | | |
| 14 | 1 | 0 | 0 | | | |
| 15 | 1 | 0 | 1 | | | |
| 16 | 1 | 0 | 2 | | | |

Window Size: 16

FIG. 10A

| MD1<br>- Rank intlv: (BW-a)th bit,<br>- Bank intlv: hashing function1 | |
|---|---|
| EV1 (rank) | – |
| EV2 (bank) | – |
| EV3 (row) | – |
| RUV | – |

| MD2<br>- Rank intlv: (BW-b)th bit,<br>- Bank intlv: hashing function2 | |
|---|---|
| EV1 (rank) | – |
| EV2 (bank) | – |
| EV3 (row) | – |
| RUV | – |

| MD3<br>- Rank intlv: (BW-c)th bit,<br>- Bank intlv: hashing function3 | |
|---|---|
| EV1 (rank) | – |
| EV2 (bank) | – |
| EV3 (row) | – |
| RUV | – |

FIG. 10B

| MD1<br>- Rank intlv: (BW–a)th bit,<br>- Bank intlv: hashing function1 | |
|---|---|
| EV1 (rank) | 1.38 |
| EV2 (bank) | 4 |
| EV3 (row) | 4 |
| RUV | 38.67 |

| MD2<br>- Rank intlv: (BW–b)th bit,<br>- Bank intlv: hashing function2 | |
|---|---|
| EV1 (rank) | 1.5 |
| EV2 (bank) | 12 |
| EV3 (row) | 1.25 |
| RUV | 67.13 |

| MD3<br>- Rank intlv: (BW–c)th bit,<br>- Bank intlv: hashing function3 | |
|---|---|
| EV1 (rank) | 1.38 |
| EV2 (bank) | 11 |
| EV3 (row) | 1.36 |
| RUV | 58.86 |

MD1 selected(Default)
MD2 and MD3 (Background count)

FIG. 10C

| MD1<br>- Rank intlv: (BW-a)th bit,<br>- Bank intlv: hashing function1 | |
|---|---|
| EV1<br>(rank) | 1.25 |
| EV2<br>(bank) | 10 |
| EV3<br>(row) | 1.5 |
| RUV | 50.55 |

| MD2<br>- Rank intlv: (BW-b)th bit,<br>- Bank intlv: hashing function2 | |
|---|---|
| EV1<br>(rank) | 1.38 |
| EV2<br>(bank) | 9 |
| EV3<br>(row) | 1.33 |
| RUV | 54.02 |

| MD3<br>- Rank intlv: (BW-c)th bit,<br>- Bank intlv: hashing function3 | |
|---|---|
| EV1<br>(rank) | 1.5 |
| EV2<br>(bank) | 11 |
| EV3<br>(row) | 1 |
| RUV | 64.99 |

MD2 selected
MD1 and MD3 (Background count)

FIG. 10D

| MD1<br>- Rank intlv: (BW-a)th bit,<br>- Bank intlv: hashing function1 | |
|---|---|
| EV1<br>(rank) | 1.5 |
| EV2<br>(bank) | 12 |
| EV3<br>(row) | 1.33 |
| RUV | 67.03 |

| MD2<br>- Rank intlv: (BW-b)th bit,<br>- Bank intlv: hashing function2 | |
|---|---|
| EV1<br>(rank) | 1.5 |
| EV2<br>(bank) | 11 |
| EV3<br>(row) | 1.36 |
| RUV | 64.56 |

| MD3<br>- Rank intlv: (BW-c)th bit,<br>- Bank intlv: hashing function3 | |
|---|---|
| EV1<br>(rank) | 1.75 |
| EV2<br>(bank) | 13 |
| EV3<br>(row) | 1.23 |
| RUV | 81 |

MD3 selected
MD1 and MD2 (Background count)

FIG. 10E

| MD1<br>- Rank intlv: (BW-a)th bit,<br>- Bank intlv: hashing function1 | | MD2<br>- Rank intlv: (BW-b)th bit,<br>- Bank intlv: hashing function2 | | MD3<br>- Rank intlv: (BW-c)th bit,<br>- Bank intlv: hashing function3 | |
|---|---|---|---|---|---|
| EV1 (rank) | 1.88 | EV1 (rank) | 1.75 | EV1 (rank) | 2 |
| EV2 (bank) | 13 | EV2 (bank) | 14 | EV2 (bank) | 9 |
| EV3 (row) | 1.15 | EV3 (row) | 1 | EV3 (row) | 1.11 |
| RUV | 68.8 | RUV | 83.72 | RUV | 82.81 |

MD3 selected
MD1 and MD2 (Background count)

MEMORY CONTROLLER AND APPLICATION PROCESSOR FOR CONTROLLING UTILIZATION AND PERFORMANCE OF INPUT/OUTPUT DEVICE AND METHOD OF OPERATING THE MEMORY CONTROLLER

CROSS-REFERENCE TO RELATED APPLICATION

This application claims the benefit of Korean Patent Application No. 10-2018-0017059, filed on Feb. 12, 2018, in the Korean Intellectual Property Office, the disclosure of which is incorporated herein in its entirety by reference.

BACKGROUND

Example embodiments of inventive concepts relate to a memory controller and/or an application processor. For example, at least some example embodiments relate to a memory controller for controlling utilization and performance of an input/output (I/O) device, an application processor (AP) including a memory controller and/or a method of operating the memory controller.

A memory controller or an AP may be used in an electronic system such as a data processing system and may exchange various signals with various peripheral devices. For example, the memory controller may control a volatile memory device such as dynamic random access memory (DRAM) or a nonvolatile memory device such as flash memory or resistive memory and may translate a system address, which is received from a host processor requesting access to the memory device, into a memory address suitable for the memory device. The memory controller may utilize an address translation scheme to translate the system address into the memory address.

SUMMARY

Example embodiments of the inventive concepts provide a memory controller for increasing the utilization and performance of a memory device and other input/output devices, an application processor including the memory controller, and/or a method of operating the memory controller.

According to some example embodiments of the inventive concepts, there is provided a memory controller for controlling a memory device. The memory controller includes processing circuitry configured to, translate, based on an address translation scheme, a first address received from a host processor into a second address associated with the memory device, the address translation scheme selected from among a plurality of address translation schemes based on memory resource utilization, and evaluate the memory resource utilization of each of the plurality of address translation schemes based on a plurality of memory addresses generated using the plurality of address translation schemes.

According to other example embodiments of the inventive concepts, there is provided an application processor including a host processor configured to provide an access request and a first address; and a memory controller configured to, perform address translation to translate, based on a first address translation scheme selected from a plurality of address translation schemes, the first address into a second address associated with a memory address, calculate a resource utilization score indicating memory resource utilization of each of the plurality of address translation schemes while performing the address translation based on the first address translation scheme during a first time period, and perform the address translation to translate, based on a second address translation scheme, the first address into the second address during a second time period such that the memory resource utilization of the second address translation scheme is highest among the plurality of address translation schemes during the first time period, the second time period being after the first time period.

According to still other example embodiments of the inventive concepts, there is provided a method of operating a memory controller to translate a system address to a memory address associated with a memory device. In some example embodiments, the method includes translating the system address into the memory address based on an address translation scheme selected from among a plurality of translation scheme candidates; calculating resource utilization scores of the plurality of translation scheme candidates; selecting a next address translation scheme having highest resource utilization from the plurality of translation scheme candidates based on the resource utilization scores; changing the address translation scheme to the next translation scheme; and translating the system address into the memory address based on the next address translation scheme.

According to still other example embodiments of the inventive concepts, there is provided a data processing system including at least one intellectual property (IP) block; an input/output device configured to access the at least one IP block; and a controller configured to time-sequentially derive a plurality of address translation schemes and a resource utilization score of each of the plurality of address translation schemes by performing machine learning based on system addresses received from the at least one IP block, and translate the system addresses received from the at least one IP block into a device address for the input/output device based on an address translation scheme selected from the plurality of address translation schemes based on the resource utilization score.

BRIEF DESCRIPTION OF THE DRAWINGS

Example embodiments of the inventive concepts will be more clearly understood from the following detailed description taken in conjunction with the accompanying drawings in which:

FIG. 8 is a diagram for explaining evaluation items for calculation of a resource utilization score and a method of calculating values of the evaluation items in a specified example;

FIGS. 10A through 10E are diagrams for explaining a method of dynamically changing an address translation scheme, which reflects a use pattern, using a memory controller, according to an example embodiment of the inventive concepts;

DETAILED DESCRIPTION

Figure 1:
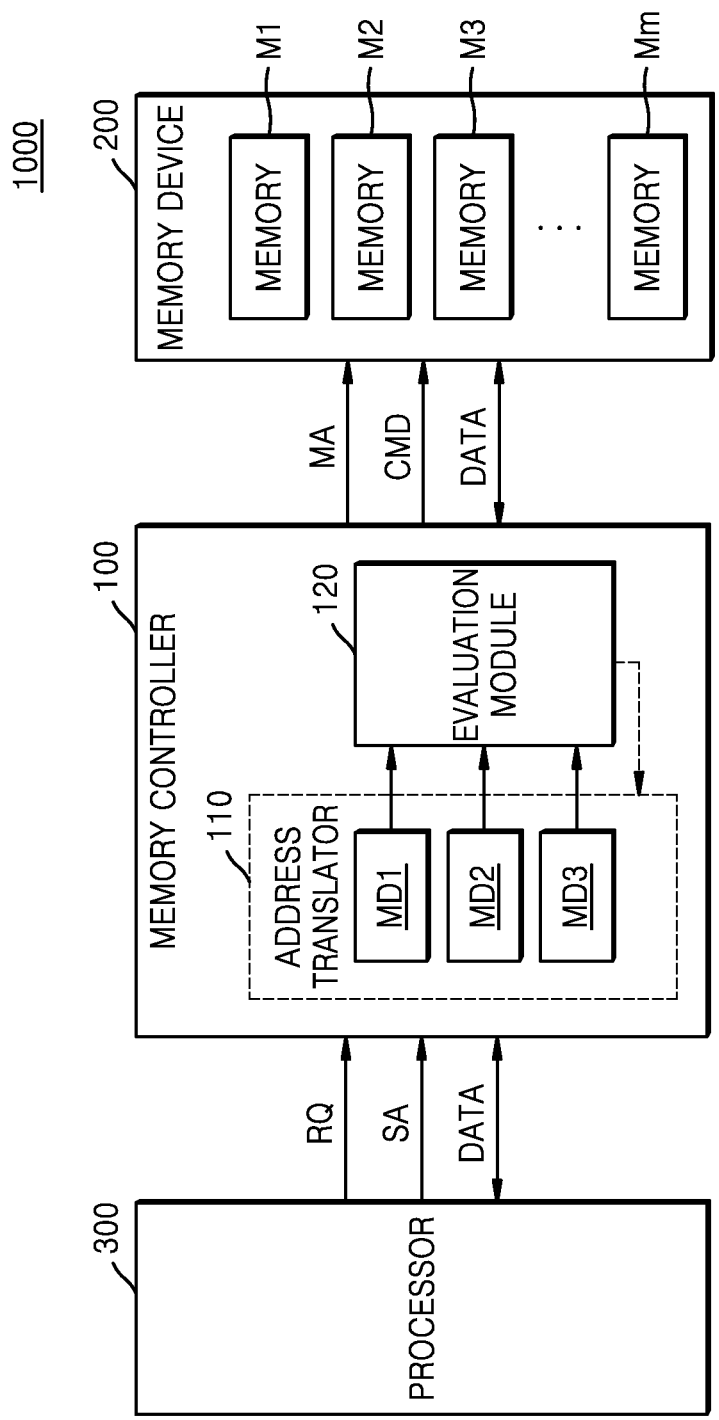
FIG. 1 is a block diagram of a data processing system including a memory controller, according to an example embodiment of the inventive concepts.

FIG. 1 is a block diagram of a data processing system including a memory controller, according to an example embodiment of the inventive concepts.

Referring to FIG. 1, a data processing system 1000 may be mounted on various types of electronic devices such as a laptop computer, a smart phone, a tablet personal computer (PC), a drone, a personal digital assistant (PDA), an enterprise digital assistant (EDA), a digital camera, a portable multimedia player (PMP), a handheld game console, a mobile internet device, a multimedia device, a wearable computer, an internet of things (IoT) device, an internet of everything (IoE) device, an e-book, a smart home appliance, a medical device, and a vehicle driving device.

The data processing system 1000 may include a memory controller 100, a memory device 200, and a processor 300. The data processing system 1000 may also include various types of input/output (I/O) devices and intellectual properties (IPs) (or IP blocks). In some example embodiments, the memory controller 100 and the processor 300 may be integrated into a single semiconductor chip. For example, the memory controller 100 and the processor 300 may form an application processor (AP) implemented as a system on chip (SoC).

The processor 300 is an IP that requests access to the memory device 200. The processor 300 may include, for example, a central processing unit (CPU), a graphics processing unit (GPU), and a display controller, and may be referred to as a master IP. The processor 300 may transmit an access request RQ (e.g., a write request or a read request for data DATA) and a system address SA to the memory controller 100 through a system bus.

The memory device 200 may include volatile memory and/or nonvolatile memory. When the memory device 200 includes volatile memory, the memory device 200 may include memory such as double data rate (DDR) synchronous dynamic random access memory (SDRAM), low power DDR (LPDDR) SDRAM, graphics DDR (GDDR) SDRAM, and Rambus DRAM (RDRAM). However, example embodiments of the inventive concepts are not limited thereto. For example, the memory device 200 may include nonvolatile memory such as flash memory, magnetic RAM (MRAM), ferroelectric RAM (FRAM), phase-change RAM (PRAM), and resistive RAM (ReRAM).

The memory device 200 may include a plurality of memories M1 through Mm. Each of the memories M1 through Mm refers to a physically and logically classified memory resource. Each of the memories M1 through Mm may include a memory rank, a memory bank, a memory row (or page), and a memory column, which are hereinafter referred to as a rank, a bank, a row, and a column, or may include logically classified regions.

The memory device 200 may be a semiconductor package including at least one memory chip or a memory module in which a plurality of memory chips are mounted on a module board. The memory device 200 may be embedded in an SoC.

The memory controller 100 is an interface which controls access to the memory device 200 according to the type of the memory device 200 (e.g., flash memory or DRAM). The memory controller 100 may control the memory device 200 such that data DATA is written to the memory device 200 in response to a write request received from the processor 300 or is read from the memory device 200 in response to a read request received from the processor 300. The memory controller 100 generates various signals, e.g., a command CMD and a memory address MA, for controlling the memory device 200, and provides the various signals to the memory device 200 according to the access request RQ and the system address SA of the processor 300.

The memory controller 100 may translate the system address SA received from the processor 300 into the memory address MA corresponding to the memory device 200. The system address SA refers to an address structure recognized by the processor 300, and the memory address MA refers to an address structure, such as a rank, a bank, a row, or a column, recognized by the memory device 200. The memory controller 100 may translate the system address SA into the memory address MA based on an address translation scheme which has been set. An address translation scheme will be described with reference to FIG. 2.

Figure 2:
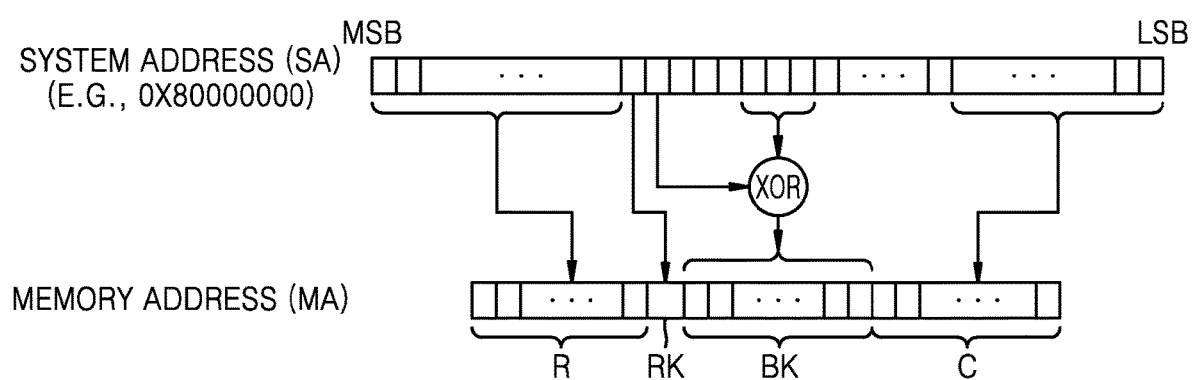
FIG. 2 is a diagram for explaining an example of an address translation scheme.

FIG. 2 is a diagram for explaining an example of an address translation scheme.

Referring to FIG. 2, the system address SA and the memory address MA may include a plurality of bits. Here, MSB denotes a most significant bit and LSB denotes least significant bit. As a non-limiting example, the system address SA may be expressed as a hex code (e.g., 0X80000000) which has eight code values and may include 32 bits. 32 bits of the system address SA may be allocated among a rank signal RK, a bank signal BK, a row signal R, and a column signal C of the memory address MA. A rank, a bank, a row, and a column, which correspond to the memory address MA, may be selected in the memory device 200 according to the rank signal RK, the bank signal BK, the row signal R, and the column signal C of the memory address MA.

The address translation scheme may refer to a method of allocating bits included in the system address SA to the rank signal RK, the bank signal BK, the row signal R, and the column signal C. For example, as shown in FIG. 2, some bits or one bit among the bits of the system address SA may be allocated to one signal among the rank signal RK, the bank signal BK, the row signal R, and the column signal C or may undergo an operation (e.g., an exclusive OR operation) with other bits, and the operation result may be allocated to one signal among the rank signal RK, the bank signal BK, the row signal R, and the column signal C. The address translation scheme may be represented with a position of a bit allocated to one signal among the rank signal RK, the bank signal BK, the row signal R, and the column signal C and a hashing function using the bit. The address translation scheme may vary with a selection of the bit position and the hashing function.

Referring back to FIG. 1, the memory controller 100 may include processing circuitry and memory.

The processing circuitry may be, but not limited to, a processor, Central Processing Unit (CPU), a controller, an arithmetic logic unit (ALU), a digital signal processor, a microcomputer, a field programmable gate array (FPGA), an Application Specific Integrated Circuit (ASIC), a System-on-Chip (SoC), a programmable logic unit, a microprocessor, or any other device capable of performing operations in a defined manner.

The processing circuitry may be configured, through a layout design or execution of computer readable instructions stored in a memory (not shown), as a special purpose computer to implement the functions of an address translator 110 and an evaluation module 120

The address translator 110 may include a plurality of address translation modules, e.g., a first address translation module MD1, a second address translation module MD2, and a third address translation module MD3, implemented according to different address translation schemes (or address mapping schemes). Address translation schemes of the respective first through third address translation modules MD1 through MD3 may be set (or, alternatively, predetermined), and the first through third address translation modules MD1 through MD3 may be implemented by hardware. However, example embodiments of the inventive concepts are not limited thereto. In some example embodiments, the first through third address translation modules MD1 through MD3 may be implemented by processing circuitry executing software to transform the processor into a special purpose processor, and address translation schemes may be drawn during the operation of the data processing system 1000. Although the address translator 110 includes the first through third address translation modules MD1 through MD3 in FIG. 1, example embodiments of the inventive concepts are not limited thereto. The address translator 110 may include at least two address translation modules.

Each of the first through third address translation modules MD1 through MD3 may perform address translation on the system address SA and generate the memory address MA. However, the memory address MA output from one address translation module selected from the first through third address translation modules MD1 through MD3 may be transmitted to the memory device 200. In other words, the first through third address translation modules MD1 through MD3 may be translation module candidates for an address translation module applied to the memory device 200, and one selected from the first through third address translation modules MD1 through MD3 may actually perform address translation. For example, when the first address translation module MD1 is selected, only the memory address MA output from the first address translation module MD1 may be transmitted to the memory device 200. In other words, address translation operations of the second and third address translation modules MD2 and MD3 may be background operations.

The evaluation module 120 may evaluate memory resource utilization of each of the first through third address translation modules MD1 through MD3 in real time. In detail, the evaluation module 120 may analyze the memory address MA output from each of the first through third address translation modules MD1 through MD3 and evaluate the memory resource utilization of each of the first through third address translation modules MD1 through MD3. For example, the evaluation module 120 may calculate a resource utilization score indicating the memory resource utilization of the first address translation module MD1 based on at least two among a rank, a bank, and a row selected by the memory address MA output from the first address translation module MD1. In some example embodiments, the evaluation module 120 may calculate the resource utilization score based on a rank, a bank, and a row. The evaluation module 120 may calculate resource utilization scores of the respective second and third address translation modules MD2 and MD3 in the same manner as described above, and therefore, the evaluation module 120 may evaluate the memory resource utilization of each of the first through third address translation modules MD1 through MD3. A resource utilization score may be calculated and updated in real time. A method of calculating a resource utilization score will be described below with reference to FIGS. 8 through 10E.

The memory controller 100 may select an address translation module having the highest memory resource utilization among the first through third address translation modules MD1 through MD3, based on an up-to-date result of evaluating memory resource utilization with respect to each of the first through third address translation modules MD1 through MD3, during a system reboot or an idle period and may use the selected address translation module as an address translation module of the address translator 110. For example, the first address translation module MD1 may perform address translation, and simultaneously memory resource utilization of the first through third address translation modules MD1 through MD3 may be evaluated. When the evaluation result till a system reboot indicates that the memory resource utilization of the second address translation module MD2 is highest, an address translation module used in the address translator 110 may be changed from the first address translation module MD1 to the second address translation module MD2 during the system reboot. Since completion of the system reboot, the second address translation module MD2 may perform address translation. This procedure may be repeated.

Since the memory device 200 includes a plurality of the memories M1 through Mm, a page conflict rate (or a page hit rate) and memory utilization of the memory device 200 may vary with an address translation scheme used in the memory controller 100, i.e., which of the memories M1 through Mm the system address SA is mapped to. Even if an address translation scheme which may maximize memory utilization under various conditions is selected through many performance tests during the manufacture of the memory controller 100, the standardized address translation scheme may not be in accord with use patterns of various users. According to a user's use pattern, i.e., what type of applications are usually executed by the user among applications available in the data processing system 1000, the pattern of the system address SA received from the processor 300, i.e., positions of bits frequently toggled among all bits included in the system address SA, may be changed.

Meanwhile, the result of evaluating memory resource utilization with respect to a plurality of address translation schemes in the memory controller 100 may vary with the pattern of the system address SA. Accordingly, in one more ore example embodiments, the memory controller 100 may adaptively operate an address translation scheme according to the pattern of the system address SA by evaluating memory resource utilization in real time with respect to a plurality of address translation schemes and dynamically changing an address translation scheme based on the evaluation result. As a result, the utilization and performance of the memory device 200 may be increased.

Figure 3A:
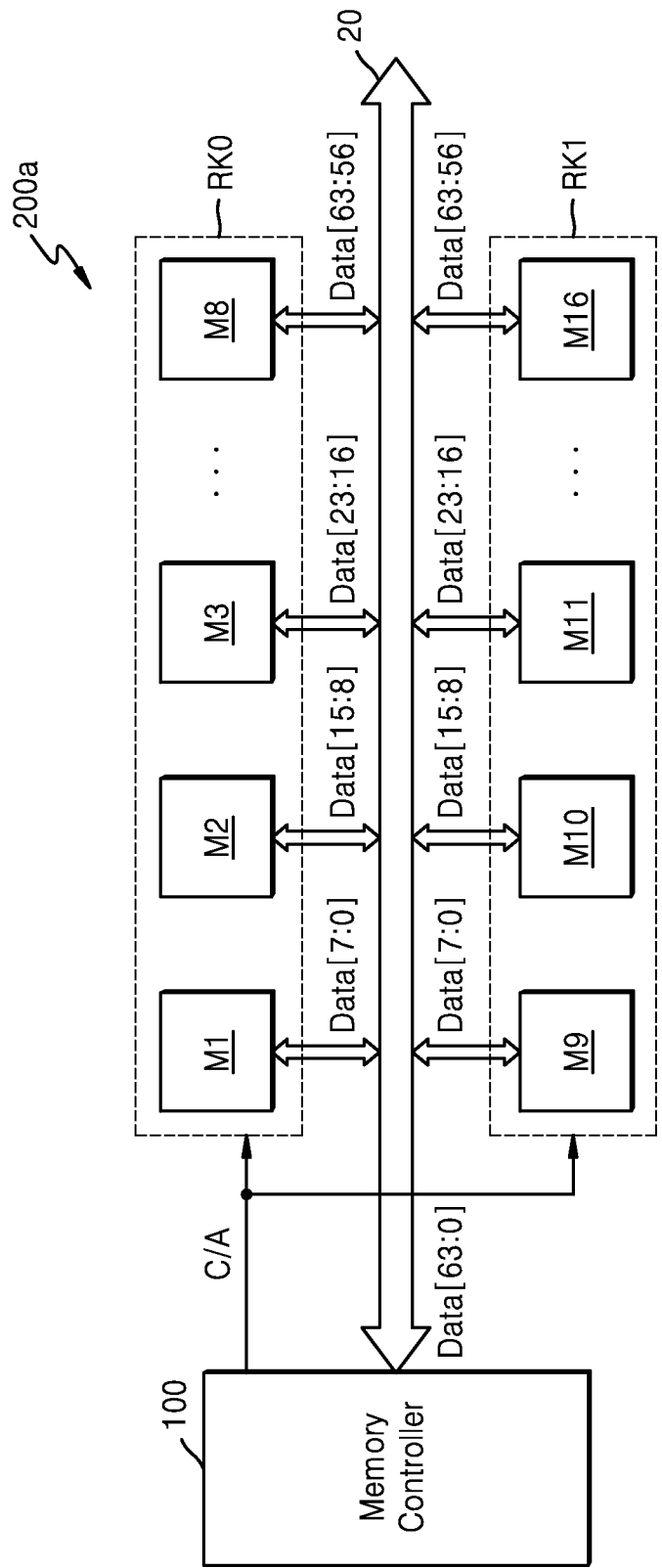
FIGS. 3A and 3B are diagrams for explaining an example of a memory device of FIG. 1.
Figure 3B:
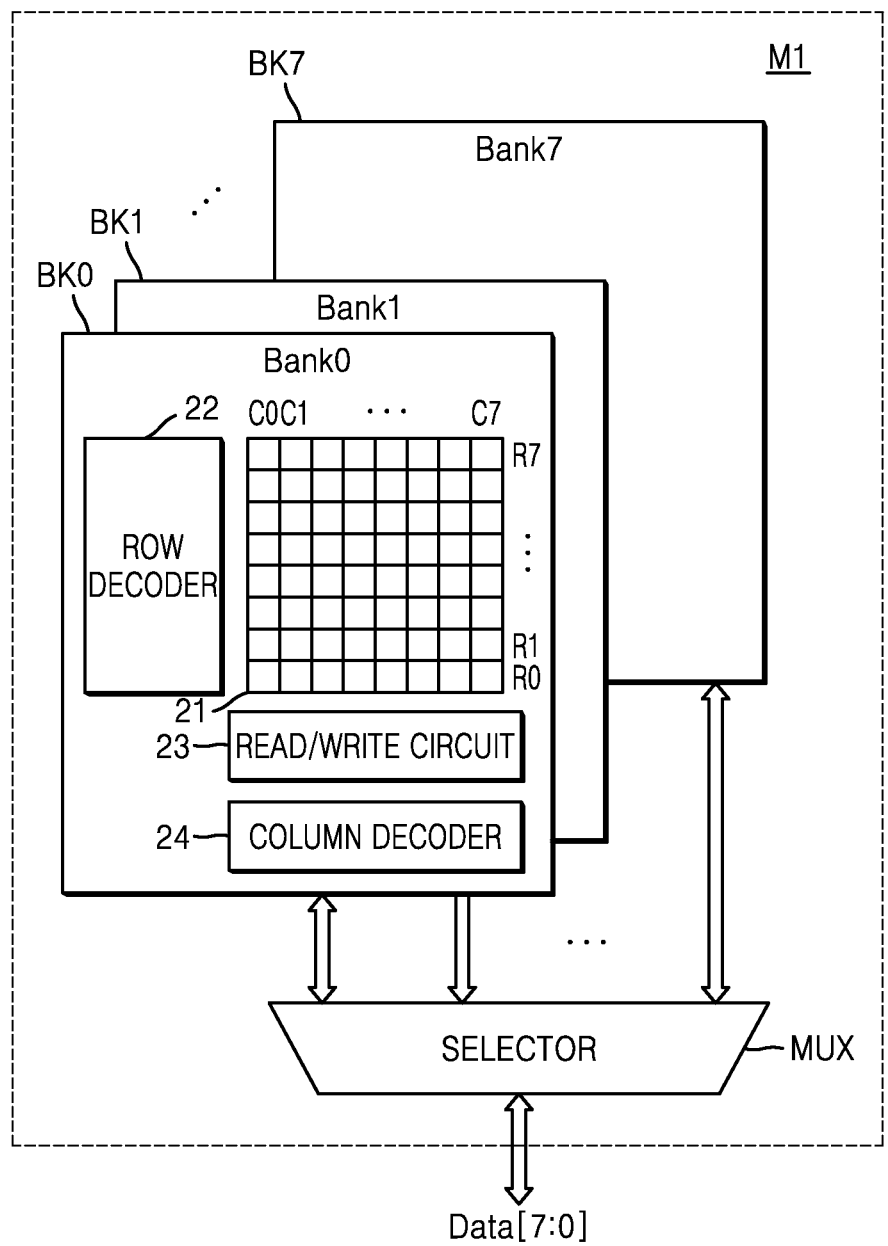

FIGS. 3A and 3B are diagrams for explaining an example of a memory device of FIG. 1.

Referring to FIG. 3A, a memory device 200a may include first through 16th memories M1 through M16. The first through eighth memories M1 through M8 may form a first rank RK0 and the ninth through 16th memories M9 through M16 may form a second rank RK1. A command and address signal C/A may be transmitted from the memory controller 100 to the memory device 200a. The memory address MA included in the command and address signal C/A may include a rank signal, a bank signal, a row signal, and a column signal, as described above. The memory controller 100 may exchange data including a plurality of bits, e.g., Data[63:0] including 64 bits, with the memory device 200a through a data bus (or a data channel) 20. Hereinafter, it is assumed that a write command is received from the memory controller 100.

Data[63:0] may be transmitted by eight bits to the first through eighth memories M1 through M8 and to the ninth through 16th memories M9 through M16. One of the first and second ranks RK0 and RK1 may be selected according to a rank signal of the memory address MA, and Data[63:0] may be transmitted to the selected rank.

The first memory M1 of FIG. 3A will be described with reference to FIG. 3B. The first memory M1 may include first through eighth banks BK0 through BK7. Data[7:0] may be transmitted to a selected bank through a selector MUX. The selector MUX may operate based on a bank of the memory address MA. One of the first through eighth banks BK0 through BK7 may be selected according to a bank signal of the memory address MA, and Data[7:0] may be transmitted to the selected bank.

Each of the first through eighth banks BK0 through BK7 may include a memory cell array 21, a row decoder 22, a read/write circuit 23, and a column decoder 24. The memory cell array 21 may include first through eighth rows R0 through R7 and first through eighth columns C0 through C7. The row decoder 22 and the column decoder 24 may select a region (e.g., a page) to which Data[7:0] is written in the memory cell array 21 according to a row and a column of the memory address MA. The read/write circuit 23 may write Data[7:0] to the selected region.

Time during which data is transmitted and received between the memory controller 100 and the memory device 200 and time taken for data to be written to a rank, a bank, and a row which are selected by the memory address MA may influence memory latency. When sequentially received memory addresses MA select different ranks or different banks, writing may be performed in the ranks and the banks in parallel. In addition, when the sequentially received memory addresses MA select the same rank, the same bank, and the same row, a write time may be decreased as compared to when the sequentially received memory addresses MA select the same rank and bank but different rows. As described above, when the memory addresses MA select different ranks or banks or the same rank, bank and row, memory utilization may be increased and latency may be decreased.

Accordingly, the memory controller 100 may increase memory utilization by evaluating in real time memory resource utilization with respect to a plurality of address translation schemes based on at least two among a rank, a bank, and a row which are selected by the memory address MA output according to the address translation schemes and by dynamically using an address translation scheme having highest memory resource utilization.

Figure 4:
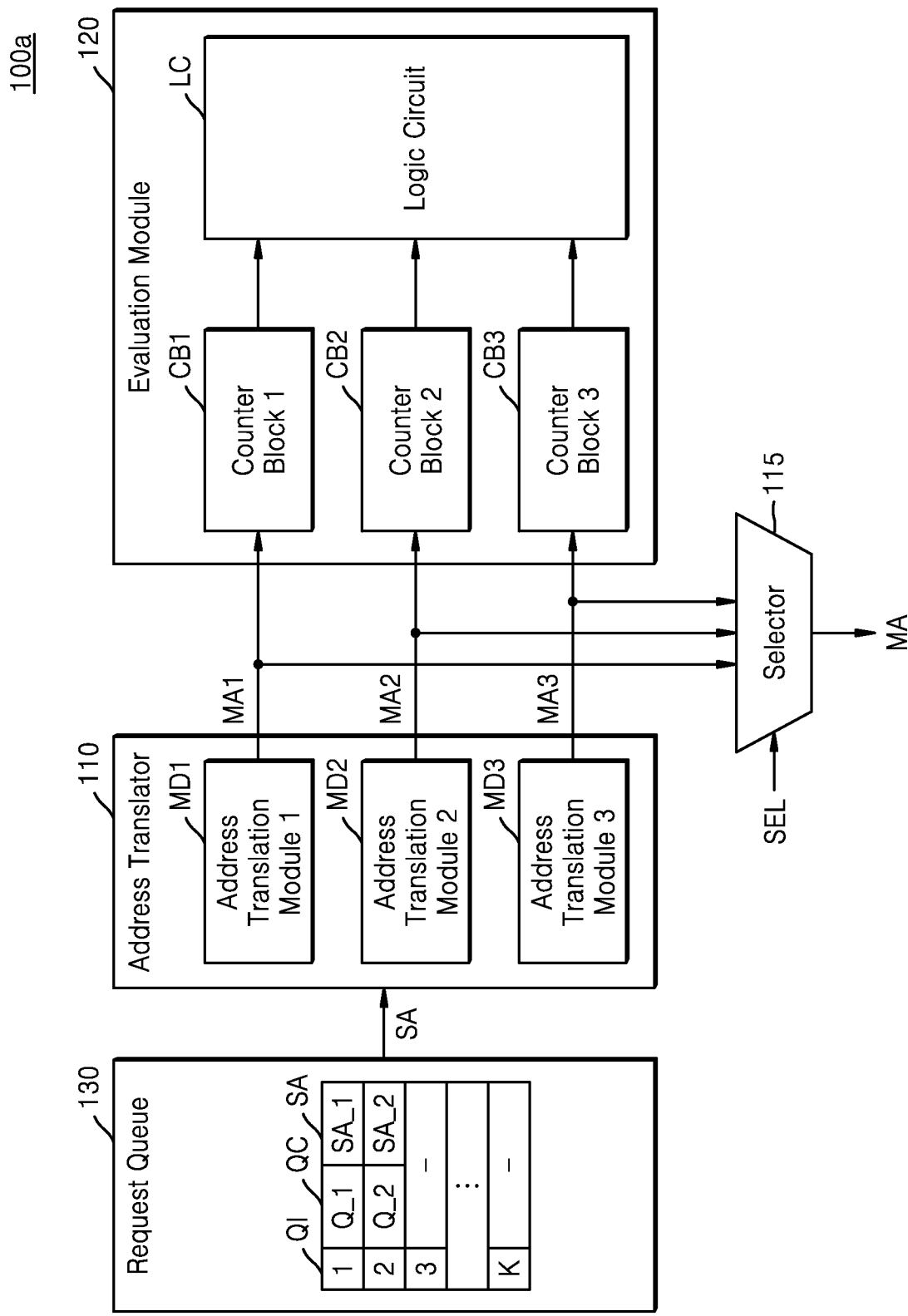
FIG. 4 is a block diagram of a memory controller according to an example embodiment of the inventive concepts.

FIG. 4 is a block diagram of a memory controller according to an example embodiment of the inventive concepts.

Referring to FIG. 4, a memory controller 100a may include the address translator 110, the evaluation module 120, and a request queue 130.

A queue index QI may be set in the request queue 130. Access requests received from the processor 300 (of FIG. 1) may be queued according to the order in which they are received from the processor 300. The type of the access request QC (e.g., Q_1, and Q_2) and the system address SA (e.g. SA_1, and SA_2) corresponding to each of the access requests received from the processor 300 may be queued. For example, the type of access request QC may include one of a write request and a read request. The queued access requests may be sequentially or non-sequentially processed according to the queue order thereof. As described above with reference to FIG. 1, the address translator 110 may include a plurality of address translation modules, e.g., the first through third address translation modules MD1 through MD3. The first through third address translation modules MD1 through MD3 may respectively generate first through third memory addresses MA1, MA2, and MA3, which are different from one another, based on one system address SA. The first through third memory addresses MA1 through MA3 may be provided to the evaluation module 120 and a selector 115.

The selector 115 may select the memory address MA from the first through third memory addresses MA1 through MA3 according to a select signal SEL and may output the memory address MA to the memory device 200 (of FIG. 1). At this time, the select signal SEL may indicate which of the first through third address translation modules MD1 through MD3 has been currently selected as an address translation module of the address translator 110.

The evaluation module 120 may set the number of access requests received from the processor 300, i.e., an access request count N (where N is an integer of at least 2), as a window size and may evaluate memory resource utilization of each of the first through third address translation modules MD1 through MD3 per N access requests. In some example embodiments, the evaluation module 120 may calculate an average of ranks selected (or used) by each of the first through third address translation modules MD1 through MD3, the number of selected banks, and an average of rows selected in the same rank and bank as a first evaluation value, a second evaluation value, and a third evaluation value, respectively, and may calculate a resource utilization score based on the first through third evaluation values.

For example, when the window size is set to 16, the evaluation module 120 may count the number of ranks, the number of banks, and the number of rows each time when the number of access requests in the request queue 130 reaches 16 and may calculate and update a resource utilization score based on the number of ranks, the number of banks, and the number of rows. This will be described in detail below with reference to FIGS. 8 through 9B.

The evaluation module 120 may include a plurality of counter blocks, e.g., first through third counter blocks CB1, CB2, and CB3, and a logic circuit LC. The first through third counter blocks CB1 through CB3 may respectively receive the first through third memory addresses MA1 through MA3 respectively output from the first through third address translation modules MD1 through MD3. The first counter block CB1 will be described as an example with reference to FIG. 5.

Figure 5:
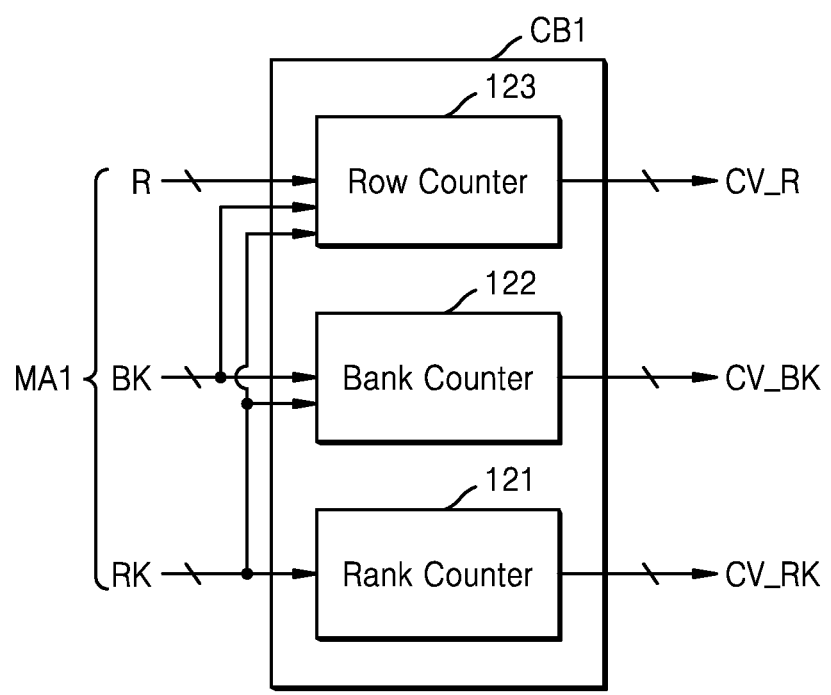
FIG. 5 is a block diagram of a first counter block of FIG. 4.

FIG. 5 is a block diagram of a first counter block of FIG. 4.

Referring to FIG. 5, the first counter block CB1 may include a rank counter 121, a bank counter 122, and a row counter 123. The rank counter 121, the bank counter 122, and the row counter 123 may respectively count ranks, banks, and rows, which are selected by first memory addresses MA1, per a set window size. For example, when the window size is set to 16, the numbers of ranks, banks, and rows indicated by 16 first memory addresses MA1 may be counted each time when the number of items in the request queue 130 reaches 16.

The rank counter 121 may count the number of ranks indicated by rank signals RK of a plurality of first memory addresses MA1 and generate a rank count value CV_RK. The rank count value CV_RK may include a count value for each of ranks, e.g., a first rank and a second rank.

The bank counter 122 may count the number of banks indicated by the rank signals RK and bank signals BK of a plurality of the first memory addresses MA1 and generate a bank count value CV_BK. For example, when a memory device includes two ranks and eight banks in each of the ranks, the bank count value CV_BK may include a count value for each of banks selected from a total of 16 banks, i.e., first through eighth banks of the first rank and first through eighth banks of the second rank.

The row counter 123 may count the number of rows indicated by the rank signals RK, the bank signals BK, and row signals R of a plurality of the first memory addresses MA1 and generate a row count value CV_R. For example, when eight rows are included in a bank within a rank, the row count value CV_R may include a count value for each of rows selected from 128 rows, i.e., eight rows in each of the 16 banks.

The operation of the second and third counter blocks CB2 and CB3 is similar to that of the first counter block CB1. Thus, redundant descriptions will be omitted.

Referring back to FIG. 4, the logic circuit LC may calculate a resource utilization score of each of the first through third address translation modules MD1 through MD3 based on count values received from the first through third counter blocks CB1 through CB3. In some example embodiments, the logic circuit LC may select an address translation module having a highest resource utilization score among the first through third address translation modules MD1 through MD3. In an example embodiment, the processor 300 (or a CPU of a data processing system equipped with a memory controller) may compare resource utilization among the first through third address translation modules MD1 through MD3 and select an address translation module having a highest resource utilization score according to the comparison result.

Figure 6:
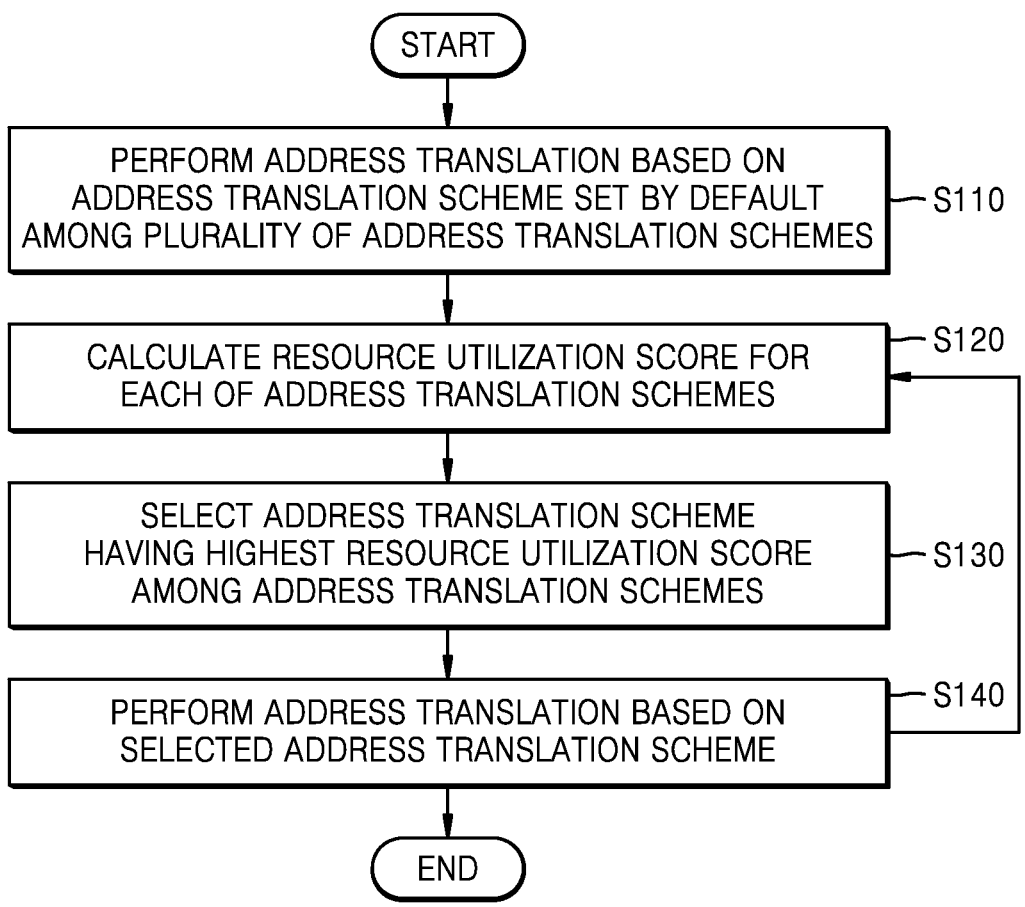
FIG. 6 is a flowchart of a method of operating a memory controller, according to an example embodiment of the inventive concepts.

FIG. 6 is a flowchart of a method of operating a memory controller, according to an example embodiment of the inventive concepts. In detail, FIG. 6 shows a method of setting an address translation scheme using a memory controller. The method shown in FIG. 6 may be performed in the memory controller 100 of FIG. 1 and the memory controller 100*a* of FIG. 4. Accordingly, the descriptions made with reference to FIGS. 1 and 4 may be applied to the method discussed herein.

Referring to FIG. 6, in operation S110, the memory controller 100, 100*a* may perform address translation based on an address translation scheme set by default among a plurality of address translation schemes. The plurality of address translation schemes may be selected (e.g., in advance) and stored in the memory controller or an external storage. In some example embodiments, the plurality of address translation schemes may be implemented by hardware, software, or a combination thereof. A default value may be set such that one of the address translation schemes is used for address translation at initial system boot. Accordingly, at the initial system boot, the memory controller 100, 100*a* may perform address translation based on the address translation scheme set by default.

In operation S120, the memory controller 100, 100*a* may calculate a resource utilization score for each of the address translation schemes. The resource utilization score for each of the address translation schemes may be calculated and updated per a set window size. The memory controller 100, 100*a* may perform operations S110 and S120 simultaneously. Further, in some example embodiments, the memory controller 100, 100*a* may perform operation S120 as a background operation.

Operation S120 will be described in detail with reference to FIG. 7.

Figure 7:
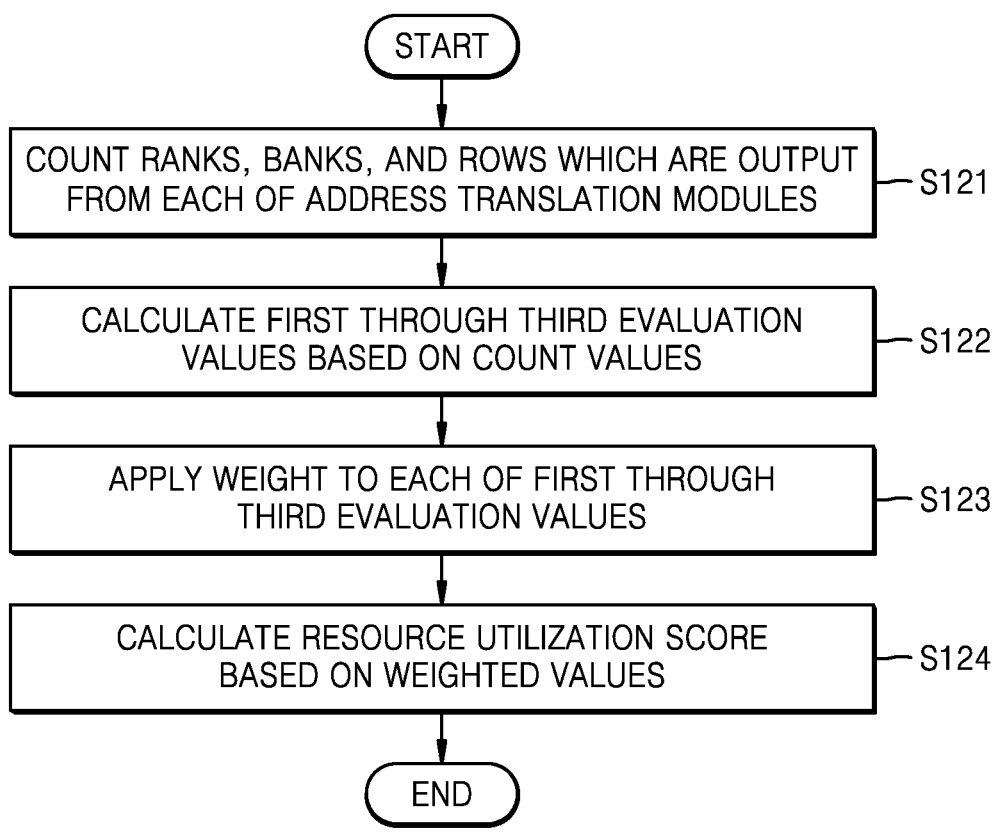
FIG. 7 is a flowchart of a method of calculating a resource utilization score in FIG. 6.

FIG. 7 is a flowchart of a method of calculating a resource utilization score in FIG. 6.

Referring to FIG. 7, in operation S121, the memory controller 100, 100*a* may count a rank signal, a bank signal, and/or a row signal which are output from each of a plurality of address translation modules using the address translation schemes.

In operation S122, the memory controller 100, 100*a* may calculate first through third evaluation values based on count values. The first evaluation value may be related to rank selection, the second evaluation value may be related to bank selection, and the third evaluation value may be related to row selection. For example, the first evaluation value may indicate an average of selected ranks in the window size, the second evaluation value indicates the number of selected banks, and the third evaluation value indicates an average of selected rows in the same ranks and the same banks.

In operation S123, the memory controller 100, 100*a* may apply a weight to each of the first through third evaluation values. In calculating a resource utilization score, the levels of importance of the first through third evaluation values may not be the same. Accordingly, a higher weight may be applied to an evaluation value determined to have a higher level of importance.

In operation S124, the memory controller 100, 100*a* may calculate the resource utilization score based on weighted values. For example, the memory controller may perform an arithmetic operation on the weighted values to calculate the resource utilization score. The method will be described in detail with reference to FIG. 8.

Referring back to FIG. 6, in operation S130, the memory controller 100, 100*a* may select an address translation scheme. For example, the memory controller 100, 100*a* may select the address translation scheme having a highest resource utilization score among the plurality of address translation schemes. In some example embodiments, apart from the memory controller 100, 100*a*, another processor, e.g., a main processor, in a data processing system equipped with the memory controller 100, 100*a* may select the address translation scheme having the highest resource utilization score. Information about the selected address translation scheme may be stored and updated in storage space, e.g., a register, inside the memory controller 100, 100*a* or nonvolatile memory (or storage) outside the memory controller 100, 100*a*. For example, when the data processing system enters an idle period, the information about the selected address translation scheme may be stored and updated in the nonvolatile memory or the storage space inside the memory controller 100, 100*a*.

Thereafter, in operation S140, the memory controller 100, 100*a* may perform address translation based on the selected address translation scheme. In other words, the address translation scheme may be changed.

When the address translation scheme is changed during system runtime, data stored in the memory device 200 may be moved to a position determined according to the changed address translation scheme. This data relocation may require significant time, and therefore, the address translation scheme may be changed when estimated time taken for the data processing system to enter and remain in the idle period is longer than time taken for data relocation.

Alternatively, the address translation scheme may be changed to the selected address translation scheme at system reboot. At the system reboot, a boot loader applies the address translation scheme updated in the nonvolatile memory when driving the system, and therefore, the memory controller 100, 100*a* may perform address translation based on the changed address translation scheme different from the address translation scheme used before the system reboot.

Meanwhile, the memory controller 100, 100*a* may repeatedly perform operations S120 through S140. Accordingly, the memory controller 100, 100*a* may perform address translation based on an address translation scheme selected based on a user's use pattern.

FIG. 8 is a diagram for explaining evaluation items for calculation of a resource utilization score and a method of calculating values of the evaluation items in a specified example.

FIG. 8 shows scores of the evaluation items for calculating a resource utilization score of the first address translation module MD1 based on the first memory address MA1 output from the first address translation module MD1. It is assumed that a window size is 16, the number of ranks in a memory device is 2, the number of banks in each rank is 8, and the number of rows in each bank is 8. It is also assumed that the first address translation module MD1 (in detail, each of first memory addresses output from the first address translation module MD1) selects a rank, a bank, and a row in response to each of system addresses received together with access requests assigned to queue indexes QI of 1 through 16, as shown in FIG. 8.

Referring to FIG. 8, the evaluation items may include a first evaluation value EV1 related to rank selection of a memory address, a second evaluation value EV2 related to bank selection of the memory address, and a third evaluation value EV3 related to row selection of the memory address. As described above, the first evaluation value EV1 indicates an average of ranks selected (or used) by the first address translation module MD1, the second evaluation value EV2 indicates the number of banks selected by the first address translation module MD1, and the third evaluation value EV3 indicates an average of rows selected by the first address translation module MD1 in the same ranks and the same banks.

With respect to the first evaluation value EV1, the distribution of rank 0 and rank 1 may be analyzed, and how many ranks on average have been selected within the window size may be calculated. For example, when only rank 0 or rank 1 is selected, it may be seen that one rank is selected on average, and 1 may be a minimum value of the first evaluation value EV1. Contrarily, when each of rank 0 and rank 1 is selected eight times, it may be seen that two ranks are selected on average, and 2 may be a maximum value of the first evaluation value EV1. As shown in FIG. 8, when rank 0 is selected 13 times and rank 1 is selected three times or vice versa, it may be calculated that 1.38 ranks are selected on average. As the first evaluation value EV1 is closer to the maximum value of 2, memory utilization may increase.

The first evaluation value EV1 may be specifically defined as Equation 1:

$$EV1 = 2*(1-(\text{Max}(PR0,PR1)-0.5)), \quad (1)$$

where PR0 is a selection ratio of rank 0 to the total number of selections (e.g., 16) and PR1 is a selection ratio of rank 1 to the total number of selections. Max(PR0,PR1) means a maximum value among the PR0 and the PR1. Meanwhile, Equation 1 is just an example formula for calculating the first evaluation value EV1 and may be changed variously.

With respect to the second evaluation value EV2, the number of banks selected within the window size may be calculated based on the result of analyzing banks selected in each of rank 0 and rank 1. For example, since eight banks are included in each rank and the window size is 16, the maximum value of the second evaluation value EV2 may be 16 and the minimum value thereof may be 1. As the second evaluation value EV2 is closer to the maximum value, the memory utilization may increase.

As shown in FIG. 8, bank 1, bank 3, and bank 7 are selected in rank 0 and bank 0 is selected in rank 1, and therefore, the second evaluation value EV2 may be 4.

With respect to the third evaluation value EV3, an average of rows selected in the same ranks and the same banks may be calculated. The minimum value of the third evaluation value EV3 may be 1 (when one row is selected 16 times in the same rank and the same bank). Since the window size is 16, the maximum value of the third evaluation value EV3 may be 16. As the third evaluation value EV3 is closer to the minimum value, the memory utilization may increase.

Referring to FIG. 8, the number of rows selected in rank 0 and bank 1 is 2, the number of rows selected in rank 0 and bank 3 is 5, the number of rows selected in rank 0 and bank 7 is 6, and the number of rows selected in rank 1 and bank 0 is 3. Accordingly, the third evaluation value EV3 may be 4.

The first evaluation value EV1, the second evaluation value EV2, and the third evaluation value EV3 may be calculated as described above. Meanwhile, in terms of increasing the memory utilization, the first evaluation value EV1 may have the highest level of importance and the third evaluation value EV3 may have the lowest level of importance. Accordingly, in calculating a resource utilization score based on the first through third evaluation values EV1 through EV3, different weights may be respectively applied to the first through third evaluation values EV1 through EV3. At this time, a highest weight may be applied to the first evaluation value EV1 and a lowest weight may be applied to the third evaluation value EV3.

As described above, as the first and second evaluation values EV1 and EV2 are closer to the maximum values and the third evaluation value EV3 is closer to the minimum value, the memory utilization may increase. A proximity to the corresponding maximum value may be calculated with respect to each of the first and second evaluation values EV1 and EV2, and a proximity to the minimum value may be calculated with respect to the third evaluation value EV3. A weight differently set for each of the evaluation items may be multiplied by each of the calculated proximities and multiplication results may be added up to calculate the resource utilization score.

For example, a proximity PXY1 to a maximum value Max_EV1 of the first evaluation value EV1 may be defined as Equation 2:

$$PXY1=1-(Max\_EC1-EV1)/(Max\_EV1-Min\_EV1). \quad (2)$$

where Min_EV1 is a minimum value of the first evaluation value EV1.

A proximity PXY2 to a maximum value Max_EV2 of the second evaluation value EV2 is defined similarly to Equation 2 and may thus be derived from Equation 2.

A proximity PXY3 to a minimum value Min_EV3 of the third evaluation value EV3 may be defined as Equation 3:

$$PXY3=(Max\_EV3-EV3)/(Max\_EV3-Min\_EV3). \quad (3)$$

For example, the proximity PXY1 of the first evaluation value EV1 may be calculated as 0.38, the proximity PXY2 of the second evaluation value EV2 may be calculated as 0.2, and the proximity PXY3 of the third evaluation value EV3 may be calculated as 0.8, in FIG. 8.

When a first weight for the first evaluation value EV1 is set to 0.50, a second weight for the second evaluation value EV2 is set to 0.29, and a third weight for the third evaluation value EV3 is set to 0.21, a resource utilization score RUV of the first address translation module MD1 may be calculated as (0.38*0.5+0.2*0.29+0.8*0.21)*100=41.6.

The method of calculating the first through third evaluation values EV1 through EV3 and the method of calculating the resource utilization score RUV based on the first through third evaluation values EV1 through EV3 have been described with reference to FIG. 8, but example embodiments of the inventive concepts are not limited thereto. The method of calculating the first through third evaluation values EV1 through EV3, the method of calculating the resource utilization score RUV, and specific figures may be changed variously. For example, the memory resource utilization is calculated based on at least two evaluation values.

Figure 9A:
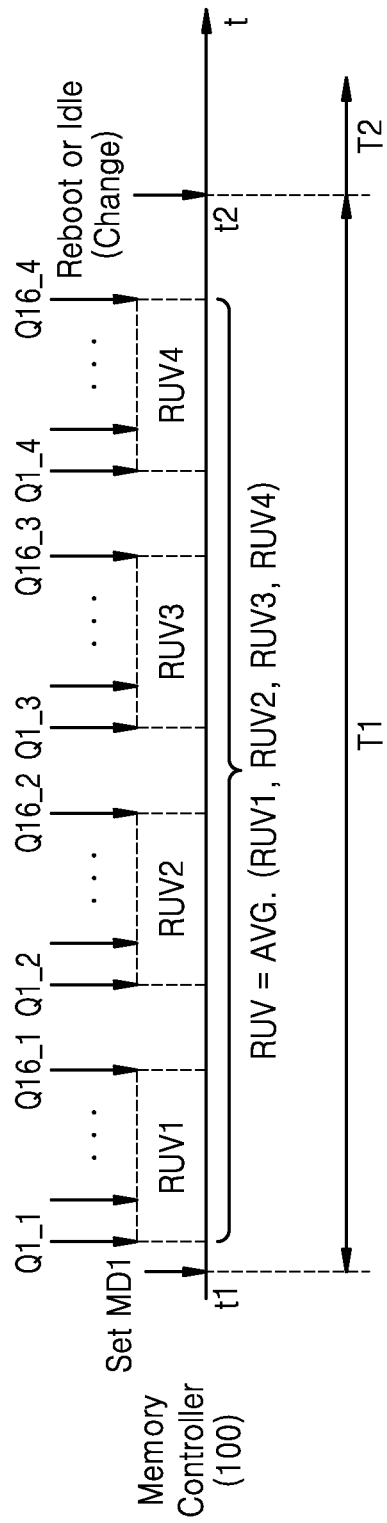
FIGS. 9A and 9B are diagrams of methods of updating a resource utilization score, according to example embodiments.
Figure 9B:
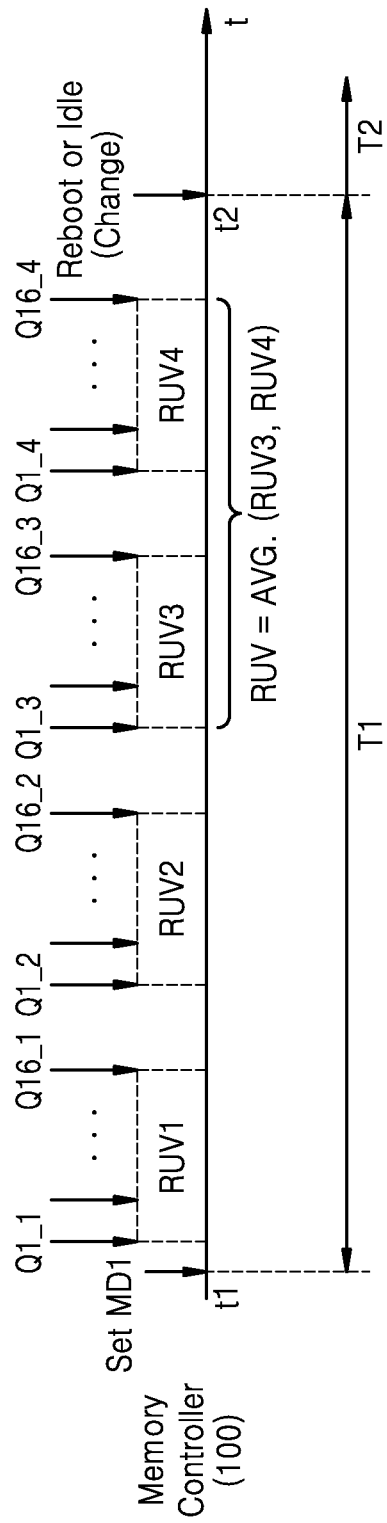

FIGS. 9A and 9B are diagrams of methods of updating a resource utilization score, according to example embodiments.

Referring to FIGS. 9A and 9B, the first address translation module MD1 may perform address translation during a time period T1 from a time point t1. System reboot or an idle period may be entered at a time point t2. As described above, a resource utilization score may be calculated per a set window size. When the window size has been set to 16, a resource utilization score may be calculated each time when 16 access requests (e.g., Q1_1 through Q16_1, Q1_2 through Q16_2, Q1_3 through Q16_3, or Q1_4 through Q16_4) have been received. For example, four resource utilization scores, i.e., a first resource utilization score RUV1, a second resource utilization score RUV2, a third resource utilization score RUV3, and a fourth resource utilization score RUV4, may be calculated.

Referring to FIG. 9A, the final resource utilization score RUV, which is considered when changing an address translation scheme, may be an average of the first through fourth resource utilization scores RUV1 through RUV4. In other words, each time when a resource utilization score is generated, an average of a new resource utilization score and an old resource utilization score may be stored as a resource utilization score. Accordingly, a user's use pattern may be accumulated and reflected in the resource utilization score.

Referring to FIG. 9B, in some other example embodiments, the memory controller 100, 100a may utilize a moving average to determine the resource utilization score. For example, an average of a desired (or, alternatively, a predetermined) number of last resource utilization scores among a plurality of resource utilization scores calculated during the time period T1 may be stored as the final resource utilization score RUV. An average of last two resource utilization scores is stored as the final resource utilization score RUV in FIG. 9B, but example embodiments of the inventive concepts are not limited thereto. The number of resource utilization scores reflected in the final resource utilization score RUV may be changed. Accordingly, a user's use pattern within a limited time period may be reflected in a resource utilization score.

FIGS. 10A through 10E are diagrams for explaining a method of dynamically changing an address translation scheme, which reflects a use pattern, using a memory controller, according to an example embodiment of the inventive concepts.

Referring to FIG. 10A, positions of bits allocated to ranks and a hashing function are different among the first through third address translation modules MD1 through MD3. In other words, different address translation schemes are respectively applied to the first through third address translation modules MD1 through MD3. For example, a rank determination scheme Rank intiv indicating a position of the bit allocated to the bank among the bits of the system address SA and a bank determination scheme Bank intiv indicating a hashing function may be set for each of the first through third address translation modules MD1 through MD3. Here, BW denotes a bitwidth of the system address SA.

The address translation schemes for the first through third address translation modules MD1 through MD3 may be selected and stored in nonvolatile storage. For example, the data processing system 1000 of FIG. 1 may also include nonvolatile memory (or storage), and the address translation schemes for the first through third address translation modules MD1 through MD3 may be stored in the nonvolatile memory before system boot.

Referring to FIG. 10B, the first address translation module MD1 may be selected by default at initial system boot, and the first address translation module MD1 may perform address translation. At this time, the resource utilization score RUV of each of the first through third address translation modules MD1 through MD3 may be calculated in real time based on a set window size. The resource utilization score RUV of the second address translation module MD2 is 67.13, which is the highest. Accordingly, a sign indicating that the resource utilization score RUV of the second address translation module MD2 is the highest may be updated and stored in the nonvolatile memory during an idle period. Thereafter, the second address translation module MD2 may perform address translation when the system is rebooted.

Referring to FIG. 10C, when the system is booted a second time, the second address translation module MD2 may perform address translation. At this time, the resource utilization score RUV of each of the first through third address translation modules MD1 through MD3 may be calculated in real time based on the window size. The resource utilization score RUV of the third address translation module MD3 is 64.99, which is the highest. Accordingly, a sign indicating that the resource utilization score RUV of the third address translation module MD3 is the highest may be updated and stored in the nonvolatile memory during an idle period. Thereafter, the third address translation module MD3 may perform address translation when the system is rebooted.

Referring to FIG. 10D, when the system is booted a third time, the third address translation module MD3 may perform address translation. At this time, the resource utilization score RUV of each of the first through third address translation modules MD1 through MD3 may be calculated. The resource utilization score RUV of the third address translation module MD3 is 81, which is the highest. Accordingly, a sign indicating that the resource utilization score RUV of the third address translation module MD3 is the highest may be updated and stored in the nonvolatile memory during an idle period. Therefore, as shown in FIG. 10E, the third address translation module MD3 may continuously perform address translation when the system is booted a fourth time.

Figure 11:
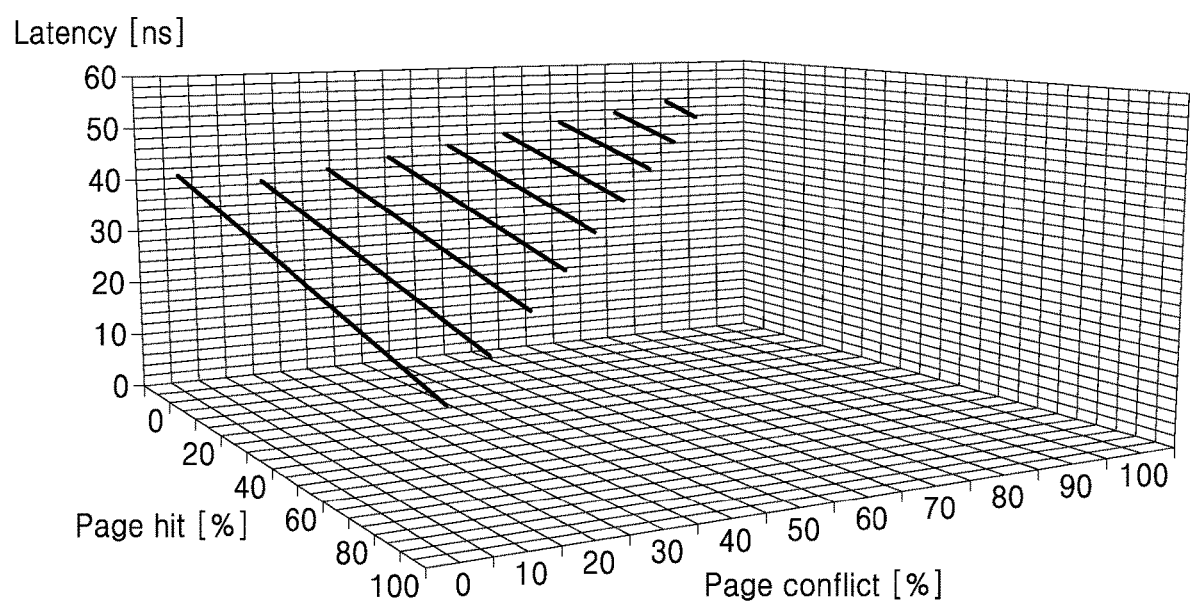
FIG. 11 is a graph showing memory latency with respect to a memory page state.

FIG. 11 is a graph showing memory latency with respect to a memory page state.

Referring to FIG. 11, as a page hit rate increases or a page conflict rate decreases, memory latency may be improved. As shown in FIG. 11, latency difference between when all memory traffic is a page hit and when all memory traffic is a page conflict may be a maximum of 37.5 nanoseconds (ns). As described above, when an address translation scheme is improved (or, alternatively, optimized) using a memory controller and a method of operating the memory controller, according to an example embodiment of the inventive concepts, the page hit rate may be increased (or, alternatively, maximized), taking a user's use pattern into account, so that memory latency may be improved.

Figure 12:
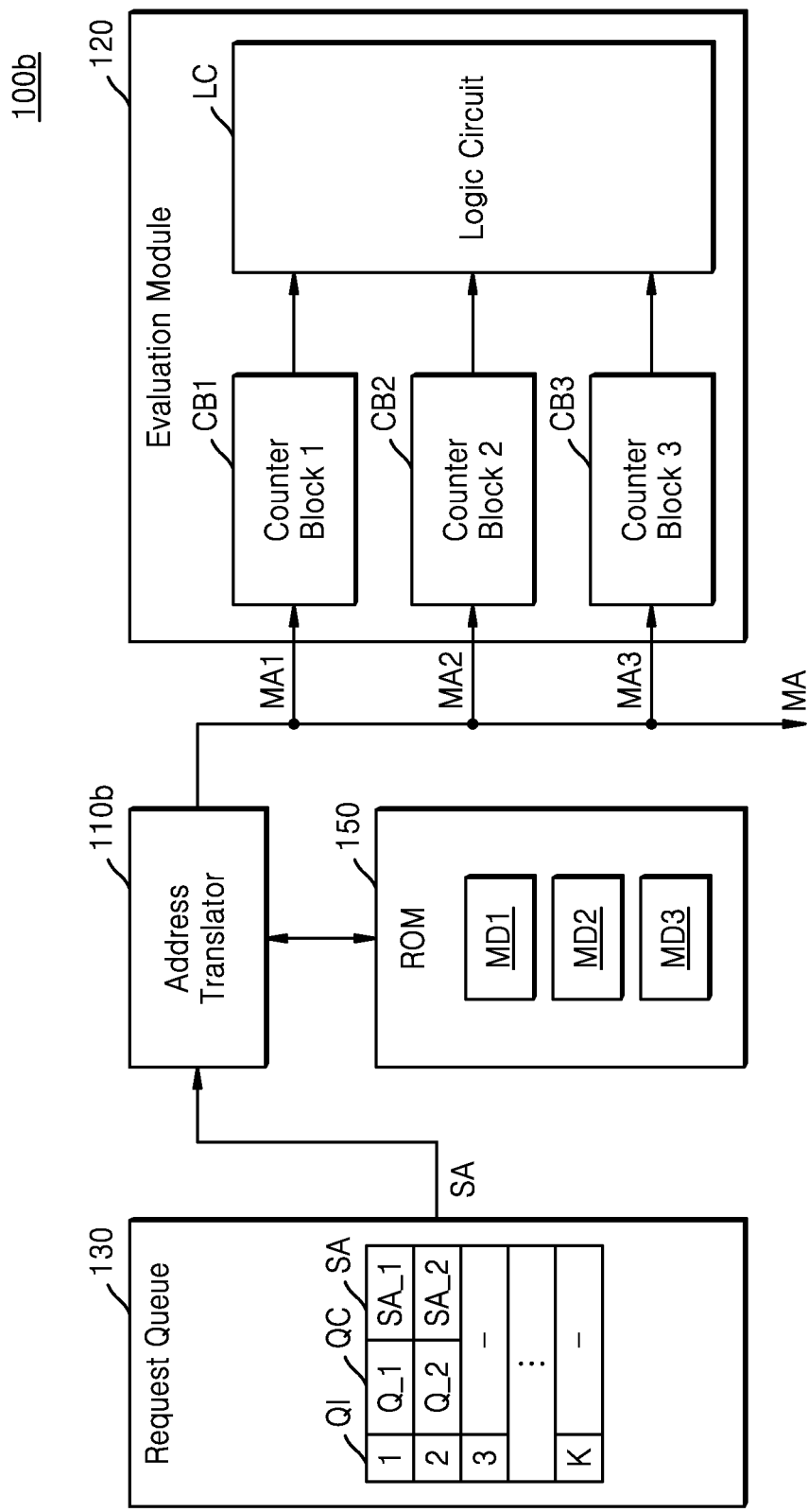
FIG. 12 is a block diagram of a memory controller according to some example embodiments of the inventive concepts.

FIG. 12 is a block diagram of a memory controller according to some example embodiments of the inventive concepts.

Referring to FIG. 12, a memory controller 100b may include an address translator 110b, read-only memory (ROM) 150, the evaluation module 120, and the request queue 130. The operations of the evaluation module 120 and the request queue 130 are the same as those described with reference to FIG. 4. Thus, redundant descriptions will be omitted, and descriptions will be focused on differences between the memory controller 100a and the memory controller 100b.

A plurality of address translation modules, i.e., the first through third address translation modules MD1 through MD3, may be implemented by processing circuitry executing software or firmware and stored in the ROM 150 (or a nonvolatile storage region). The address translator 110b may be implemented by dedicated hardware for executing the first through third address translation modules MD1 through MD3.

When a system is booted, the first through third address translation modules MD1 through MD3 may be executed by the address translator 110b, so that address translation may be performed. As described above, the address translator 110b may perform the address translation based on a default address translation module, e.g., the first address translation module MD1, selected by default and may also execute the second and third address translation modules MD2 and MD3 as background operation. The first memory address MA1 generated by executing the first address translation module MD1 may be output to a memory device as the memory address MA. The second memory address MA2 may be generated as the second address translation module MD2 is executed. The third memory address MA3 may be generated as the third address translation module MD3 is executed. In some example embodiments, the first through third memory addresses MA1 through MA3 may be generated time-sequentially. Each of the first through third memory addresses MA1 through MA3 may be provided to a corresponding one of the first through third counter blocks CB1 through CB3.

The evaluation module 120 may calculate a resource utilization score with respect to each of the first through third address translation modules MD1 through MD3. Information about an address translation module having a highest resource utilization score may be stored and updated in nonvolatile memory or in a register inside the address translator 110b.

Figure 13:
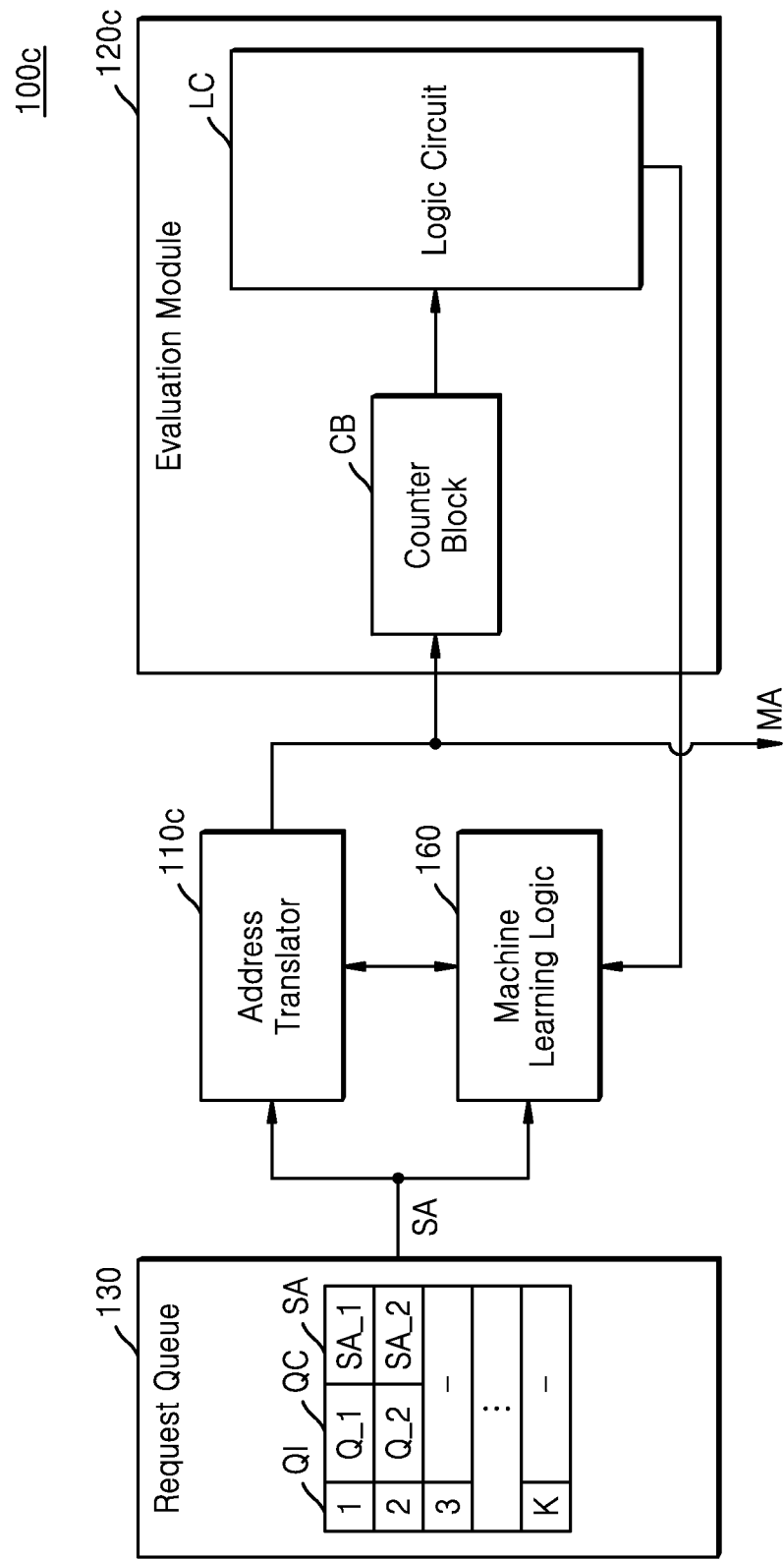
FIG. 13 is a block diagram of a memory controller according to some example embodiments of the inventive concepts.
Figure 14:
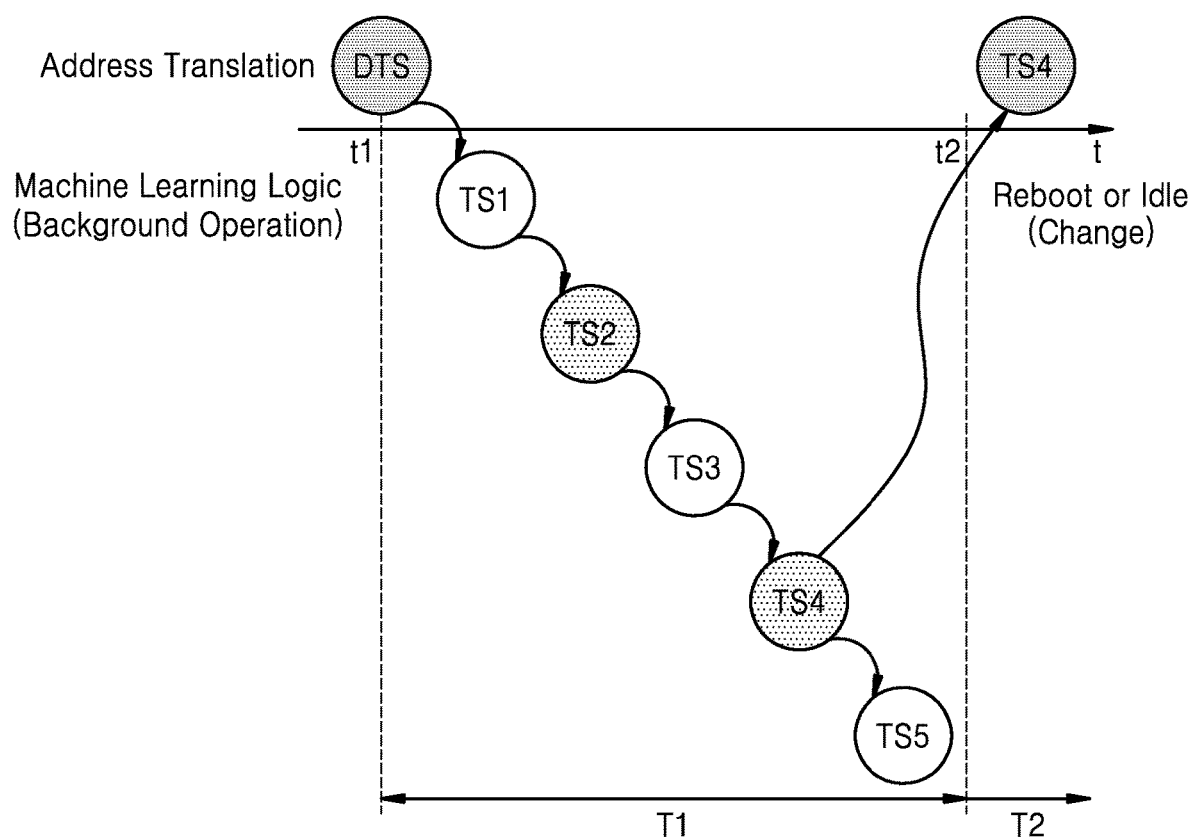
FIG. 14 is a diagram of an example of a method of setting an address translation scheme based on machine learning.

FIG. 13 is a block diagram of a memory controller according to some example embodiments of the inventive concepts. FIG. 14 is a diagram of an example of a method of setting an address translation scheme based on machine learning.

Referring to FIG. 13, a memory controller 100c may include an address translator 110c, a machine learning logic 160, an evaluation module 120c, and the request queue 130. The evaluation module 120c may include a counter block CB, and a logic circuit LC. The address translator 110c may be implemented by dedicated hardware and may perform address translation based on an address translation scheme selected by default. Although not shown, an address translation module using the address translation scheme selected by default may be implemented by processing circuitry executing software stored in ROM (not shown) or may be implemented by hardware.

The system address SA may be provided to the machine learning logic 160 as well as the address translator 110c which performs address translation. The machine learning logic 160 may perform machine leaning and analyze a pattern change of the system address SA. In addition, the machine learning logic 160 may derive a plurality of other address translation schemes time-sequentially. For example, the machine learning logic 160 may analyze a change pattern of each of bits (e.g., pattern of data toggling of each of bits) included in a large amount of the system address SA and may derive a plurality of address translation schemes from the analysis result. Although the machine learning logic 160 is included in the memory controller 100c in FIG. 13, example embodiments of the inventive concepts are not limited thereto. The machine learning logic 160 may be implemented as a separate component from the memory controller 100c and may be included in a data processing system (e.g., the data processing system 1000 of FIG. 1).

Referring to FIG. 14, the address translator 110c may perform address translation based on a default address translation scheme DTS. The evaluation module 120c may evaluate memory resource utilization with respect to the default address translation scheme DTS. For example, the evaluation module 120c may calculate a resource utilization score as described above.

Meanwhile, the machine learning logic 160 may analyze a pattern of the system address SA and derive an address translation scheme, e.g., a first address translation scheme TS1, based on the analysis result in a background operation. While generating the memory address MA by performing address translation based on the default address translation scheme DTS, the address translator 110c may also generate another memory address based on the first address translation scheme TS1 in a background operation. The evaluation module 120c may calculate a resource utilization score with respect to the first address translation scheme TS1 based on the memory address generated according to the first address translation scheme TS1.

The machine learning logic 160 may time-sequentially derive a plurality of address translation schemes based on accumulated data, e.g., the system address SA, used for training. A resource utilization score may be calculated with respect to each of the address translation schemes. At this time, the machine learning logic 160 may derive an address translation scheme based on not only the system address SA but also the calculated resource utilization scores. In other words, the machine learning logic 160 may derive a new address translation scheme, which may increase memory utilization, based on input data, e.g., the system address SA, and output data, e.g., resource utilization scores calculated with respect to the system address SA.

When a resource utilization score of a newly derived address translation scheme is higher than that of a previously derived address translation scheme or the default address translation scheme DTS, information about the newly derived address translation scheme and the resource utilization score may be stored. The information may be stored in a nonvolatile memory device. For example, when a resource utilization score of a second address translation scheme TS2 among a plurality of address translation schemes derived by the machine learning logic 160 is higher than those of the default address translation scheme DTS and the first address translation scheme TS1, information about the second address translation scheme TS2 and the resource utilization score of the second address translation scheme TS2 may be stored. Thereafter, when a resource utilization score of a fourth address translation scheme TS4 derived by the machine learning logic 160 is higher than those of the default address translation scheme DTS and previously derived address translation schemes, e.g., first through third address translation schemes TS1 through TS3, information about the fourth address translation scheme TS4 and the resource utilization score of the fourth address translation scheme TS4 may be stored. Thereafter, when the system is rebooted or enters an idle period at the time point t2, an address translation scheme may be changed. Among resource utilization scores respect to the first through fifth address translation schemes TS1 through TS5, i.e., memory resource utilization, evaluated during the time period T1, the resource utilization score of the fourth address translation scheme TS4 is highest. Accordingly, after the time point t2, i.e., during a time period T2, the address translator 110c may perform address translation based on the fourth address translation scheme TS4. During the time period T2, the machine learning logic 160 may also derive a new address translation scheme through training.

Although calculation of resource utilization scores is performed by the evaluation module 120c in some of the example embodiments, example embodiments of the inventive concepts are not limited thereto and the machine learning logic 160 may calculate the resource utilization scores. For example, the machine learning logic 160 may include the evaluation module 120c.

Figure 15:
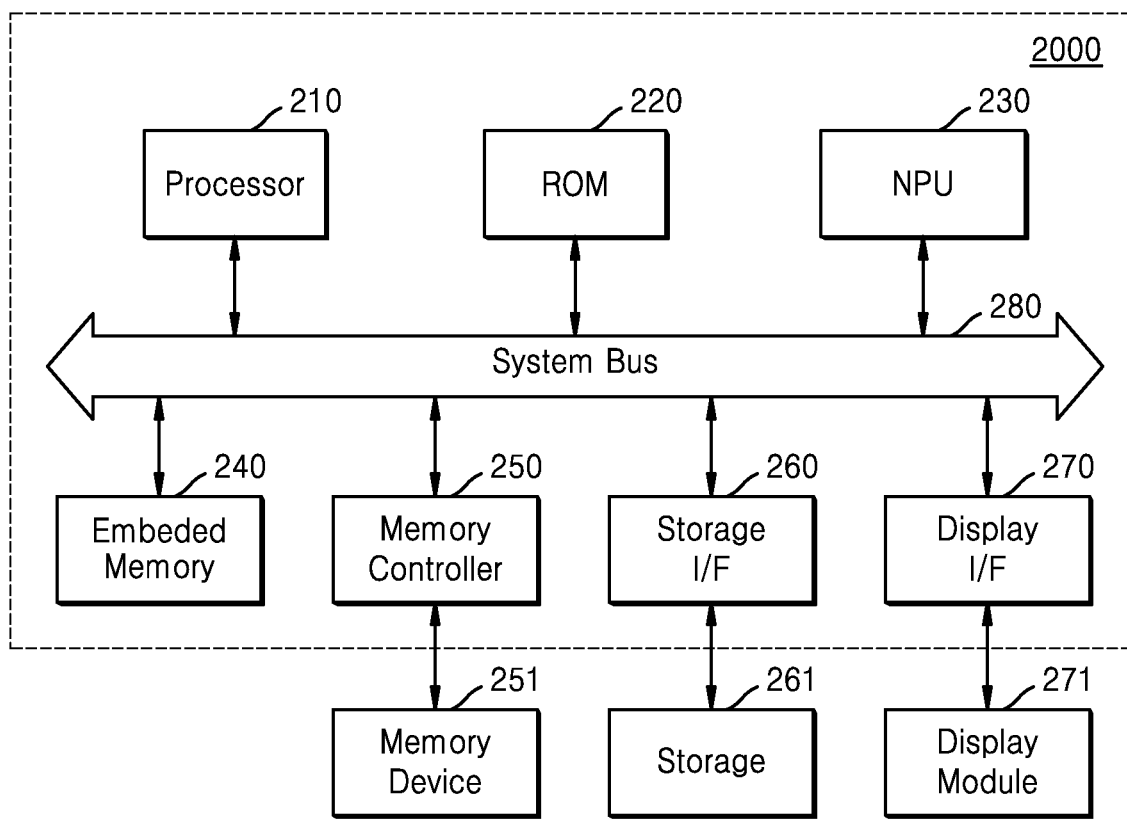
FIG. 15 is a block diagram of an application processor according to an example embodiment of the inventive concepts.

FIG. 15 is a block diagram of an AP according to an example embodiment of the inventive concepts.

Referring to FIG. 15, an AP 2000 may include at least one IP. For example, the AP 2000 may include a processor 210, ROM 220, a neural processing unit (NPU) 230, embedded memory 240, a memory controller 250, a storage interface (I/F) 260, and a display I/F 270, which are connected with one another through a system bus 280. The AP 2000 may also include other elements, e.g., I/O devices, and some elements shown in FIG. 15 may not be included in the AP 2000.

The Advanced RISC Machine (ARM) advanced microcontroller bus architecture (AMBA) protocol may be used as a standard specification for the system bus 280 of the AP 2000. Bus types of the AMBA protocol may include advanced high-performance bus (AHB), advanced peripheral bus (APB), advanced extensible interface (AXI), AXI4, and AXI coherency extensions (ACE). Besides, another type of protocols, such as uNetwork, CoreConnect, or Open Core Protocol, optimized to a system may be used.

The processor 210 may control all operations of the AP 2000. For example, software for managing operations of various IPs in the AP 2000 may be loaded to a memory device 251 provided outside the AP 2000 and/or the embedded memory 240, and the processor 210 may perform various management operations by executing the loaded software.

A boot loader may be stored in the ROM 220. Besides, various setting values related to the AP 2000 may be stored in the ROM 220.

The NPU 230 is an operation unit which performs an operation for deep learning (or a neural network). The NPU 230 may perform an operation for deep learning when a deep learning-based application is executed in the AP 2000, thereby securing performance. For example, when the memory controller 250 derives an address translation scheme through machine learning, as described above, the NPU 230 may perform an operation.

The storage I/F 260 may provide connection between the AP 2000 and a storage 261 outside the AP 2000. The storage 261 may include nonvolatile memory. The storage 261 may include cells, such as NAND or NOR flash memory cells, retaining data thereof when power is interrupted or various types of nonvolatile memory, such as MRAM, ReRAM, FRAM, or phase change memory (PCM).

The display I/F 270 may provide image data or updated image data to a display module 271 under the control of the processor 210 or GPU (not shown).

The memory device 251 may be implemented by volatile memory. In some example embodiments, the memory device 251 may include volatile memory such as DRAM and/or static RAM (SRAM).

As described above in various example embodiments, the memory controller 250 may control the memory device 251 and translate an address, e.g., a system address, received together with an access request of another IP (e.g., the processor 210) into a memory address corresponding to the memory device 251. The memory controller 250 may evaluate and score in real time each of memory addresses, which have undergone address translation according to a plurality of address translation schemes, respectively, in terms of memory resource utilization and continuously update scores during system operation. When a system enters an idle period or is rebooted, the memory controller 250 may change an address translation scheme (e.g., to an address translation scheme having a highest score), so that an address translation scheme suitable for a user pattern may be used.

The memory controller 250 may include a machine learning logic and derive an address translation scheme increasing (or, alternatively, maximizing) memory utilization through machine learning based on results of evaluating memory utilization with respect to input system addresses and address translation schemes. In some example embodiments, the machine learning logic may be implemented separately from the memory controller 250.

Meanwhile, to access the storage 261 and the display module 271, the storage I/F 260 and/or the display I/F 270 may also translate a received address into an address structure suitable for a device to be accessed. As described above with reference to the memory controller 250, the storage I/F 260 and/or the display I/F 270 may evaluate and score in real time a plurality of address translation schemes (or device mapping schemes), which have been selected in advance, in terms of device utilization and may change an address translation scheme based on scores. As a result, an address translation scheme improved (or, alternatively, optimized) to an individual user's use pattern may be used. A method of selecting an address translation scheme as one described above may also be applied to other I/O devices.

According to example embodiments of the inventive concepts, a plurality of device addresses generated based on a plurality of address translation schemes may be evaluated and scored in real time, resource utilization of each of the address translation schemes may be calculated, and address translation may be performed using an address translation scheme having a desired resource utilization (or, alternatively, a highest resource utilization), so that an address translation scheme improved (or, alternatively, optimized) to a user's use pattern may be used. As a result, utilization and performance of a memory device and other I/O devices may be increased.

According to one or more example embodiments, the units and/or devices described above including elements of the memory controller 100 such as the address translator 110, evaluation module 120 and sub-elements thereof such as the address translation modules MD1-MD3, counter blocks CB1-CB3, and logic circuit LC and selector 115 may be implemented using hardware, a combination of hardware and software, or a non-transitory storage medium storing software that is executable to perform the functions of the same.

Hardware may be implemented using processing circuitry such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, etc., capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., one or more processors, CPUs, controllers, ALUs, DSPs, microcomputers, microprocessors, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor. In another example, the hardware device may be an integrated circuit customized into special purpose processing circuitry (e.g., an ASIC).

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Software and/or data may be embodied permanently or temporarily in any type of storage media including, but not limited to, any machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including tangible or non-transitory computer-readable storage media as discussed herein.

Storage media may also include one or more storage devices at units and/or devices according to one or more example embodiments. The one or more storage devices may be tangible or non-transitory computer-readable storage media, such as random access memory (RAM), read only memory (ROM), a permanent mass storage device (such as a disk drive), and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the storage media, the computer programs, program code, instructions, or some combination thereof, may be specially designed and constructed for the purposes of the example embodiments, or they may be known devices that are altered and/or modified for the purposes of example embodiments.

While example embodiments of the inventive concepts have been particularly shown and described with reference to example embodiments thereof, it will be understood that various changes in form and details may be made therein without departing from the spirit and scope of the following claims.

What is claimed is:

1. A memory controller configured to control a memory device, the memory controller comprising:
    processing circuitry configured to,
        translate, based on a first address translation scheme, a first address received from a host processor into a second address associated with the memory device, the first address translation scheme selected from among a plurality of address translation schemes based on memory resource utilization, and
        evaluate the memory resource utilization of each of the plurality of address translation schemes based on a plurality of memory addresses generated using the plurality of address translation schemes such that the processing circuitry evaluates the memory resource utilization of each of the plurality of address translation schemes while translating the first address into the second address based on the first address translation scheme.

2. The memory controller of claim 1, wherein the processing circuitry is configured to calculate the memory resource utilization based on at least two of a first evaluation value, a second evaluation value, and a third evaluation value, and wherein
    the first evaluation value, the second evaluation value, and the third evaluation value are calculated based on rank selection, bank selection, and row selection of the plurality of memory addresses, respectively, in each of the plurality of address translation schemes.

3. The memory controller of claim 2, wherein the processing circuitry is configured to calculate the memory resource utilization based on a sum of a first value and a second value, wherein
    the first value is obtained by applying a first weight to the first evaluation value, and the second value is obtained by applying a second weight to the second evaluation value, the first weight being greater than the second weight.

4. The memory controller of claim 1, wherein the processing circuitry is configured to,
    evaluate the memory resource utilization of each of the plurality of address translation schemes during a first period associated with the first address translation scheme, and
    perform the address translation based on a second address translation scheme during a second period, the second address translation scheme being selected based on the memory resource utilization of each of the plurality of address translation schemes calculated during the first period.

5. The memory controller of claim 4, wherein the processing circuitry is configured to change the address translation scheme from the first address translation scheme to the second address translation scheme in response to a reboot of the memory controller after the first period.

6. The memory controller of claim 4, wherein the processing circuitry is configured to change the address translation scheme from the first address translation scheme into the second address translation scheme in response to entering an idle period after the first period.

7. The memory controller of claim 1, wherein the processing circuitry is configured to,
    perform the address translation using different address translation schemes to generate the plurality of memory addresses,
    generate count values by counting ranks, banks, and rows associated with the plurality of memory addresses, the ranks, the banks, and the rows being selected by the plurality of memory addresses, and
    calculate a utilization score indicating the memory resource utilization based on the count values.

8. The memory controller of claim 7, wherein the processing circuitry is configured to count the ranks, the banks, and the rows with respect to N memory addresses, where N is an integer of at least 2.

9. The memory controller of claim 1, wherein the processing circuitry is configured to perform machine learning based on a plurality of first addresses to derive the plurality of address translation schemes time-sequentially, the plurality of first addresses being received from the host processor.

10. The memory controller of claim 9, wherein the processing circuitry is configured to derive the plurality of address translation schemes based on a change pattern of bits included in the plurality of first addresses.

11. An application processor comprising:
    a host processor configured to provide an access request and a first address; and
    a memory controller configured to,
        perform address translation to translate, based on a first address translation scheme selected from a plurality of address translation schemes, the first address into a second address associated with a memory address,
        calculate a resource utilization score indicating memory resource utilization of each of the plurality of address translation schemes while performing the address translation based on the first address translation scheme during a first time period, and
        perform the address translation to translate, based on a second address translation scheme, the first address into the second address during a second time period such that the memory resource utilization of the second address translation scheme is highest among the plurality of address translation schemes during the first time period, the second time period being after the first time period.

12. The application processor of claim 11, wherein the memory controller is configured to,
    recalculate the resource utilization score of each of the plurality of address translation schemes during the second time period, and
    perform the address translation based on a third address translation scheme during a third time period after the second time period such that the memory resource utilization of the third address translation scheme is highest among the plurality of address translation schemes during the second time period, the third time period being after the second time period.

13. The application processor of claim 11, wherein the memory controller is configured to calculate the resource utilization score of the plurality of address translation schemes based on a plurality of memory addresses generated according to a selected one of the plurality of address translation schemes.

14. The application processor of claim 11, wherein the memory controller is configured to calculate the resource utilization score based on a first evaluation value calculated according to rank selection, a second evaluation value calculated according to bank selection, and a third evaluation value calculated according to row selection.

15. The application processor of claim 11, wherein the memory controller is configured to,
   perform the address translation using different ones of the plurality of address translation schemes to generate a plurality of memory addresses; and
   calculate the resource utilization score of each of the plurality of address translation schemes based on the plurality of memory addresses.

16. The application processor of claim 15, wherein the memory controller is configured to,
   generate count values by counting ranks, banks, and rows selected based on the plurality of memory addresses; and
   calculate the resource utilization score based on the count values.

17. The application processor of claim 11, wherein the memory controller is configured to,
   compare resource utilization scores calculated with respect to the plurality of address translation schemes, and
   select the second address translation scheme based on the resource utilization scores such that the memory resource utilization of the second address translation scheme is highest among the plurality of address translation schemes.

18. The application processor of claim 11, wherein information indicating that the memory resource utilization of the second address translation scheme among the plurality of address translation schemes is highest is stored in a storage device, and
the memory controller is configured to change from the first address translation scheme to the second address translation scheme based on the information loaded from the storage device at reboot after the first time period.

19. A method of operating a memory controller to translate a system address to a memory address associated with a memory device, the method comprising:
   translating the system address into the memory address based on a first address translation scheme selected from among a plurality of translation scheme candidates;
   calculating resource utilization scores of each of the plurality of translation scheme candidates while translating the system address into the memory address based on the first address translations scheme;
   selecting a next address translation scheme having highest resource utilization from the plurality of translation scheme candidates based on the resource utilization scores calculated while translating the system address into the memory address based on the first address translations scheme;
   changing the address translation scheme to the next address translation scheme; and
   translating the system address into the memory address based on the next address translation scheme.

20. The method of claim 19, wherein the calculating of the resource utilization score comprises:
   generating a plurality of memory address candidates corresponding to a plurality of system addresses based on each of the plurality of translation scheme candidates;
   generating a monitoring result by monitoring a change in memory resources associated with different ones of the plurality of memory address candidates; and
   calculating the resource utilization score based on the monitoring result.

* * * * *